US 8,250,317 B2

(12) United States Patent
Satoyama et al.

(10) Patent No.: US 8,250,317 B2
(45) Date of Patent: Aug. 21, 2012

(54) STORAGE SYSTEM MANAGING INFORMATION IN ACCORDANCE WITH CHANGES IN THE STORAGE SYSTEM CONFIGURATION

(75) Inventors: Ai Satoyama, Sagamihara (JP); Manabu Kitamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 767 days.

(21) Appl. No.: 12/132,433

(22) Filed: Jun. 3, 2008

(65) Prior Publication Data

US 2009/0248953 A1    Oct. 1, 2009

(30) Foreign Application Priority Data

Mar. 31, 2008  (JP) ................................. 2008-094044

(51) Int. Cl.
 *G06F 12/00* (2006.01)
(52) U.S. Cl. ...................................................... 711/154
(58) Field of Classification Search .................. None
 See application file for complete search history.

(56) References Cited

U.S. PATENT DOCUMENTS 7,069,408 B2   6/2006  Shimada
2002/0129216 A1   9/2002  Collins
2004/0128456 A1*  7/2004  Kobayashi et al. ........... 711/162
2004/0181600 A1*  9/2004  Yamagami .................... 709/229
2005/0050085 A1   3/2005  Shimada
2005/0172073 A1*  8/2005  Voigt et al. .................... 711/114
2006/0224844 A1* 10/2006  Kano et al. .................... 711/162
2007/0150492 A1   6/2007  Shitomi

FOREIGN PATENT DOCUMENTS

EP        1868074 A2    12/2007

OTHER PUBLICATIONS

European Search Report, dated Jul. 31, 2009 for corresponding European Patent Application No. 08171198.8.
U.S. Appl. No. 12/130,071, filed May 2008, Deguchi.

* cited by examiner

*Primary Examiner* — Duc Doan
(74) *Attorney, Agent, or Firm* — Brundidge & Stanger, P.C.

(57) ABSTRACT

A storage system capable of managing information in accordance with system configuration changes is provided.

When sub-storage systems 20A, 20B are connected to each other, a storage system 100 is managed in such a manner that the sub-storage systems 20A and 20B are connected to each other via a connection cable 44 to constitute modules 20A and 20B respectively, pieces of coupling control information of the respective modules 20A, 20B are coupled together, and the modules 20A, 20B are recognized as a single access target for data input/output requests from a host 51A.

18 Claims, 40 Drawing Sheets

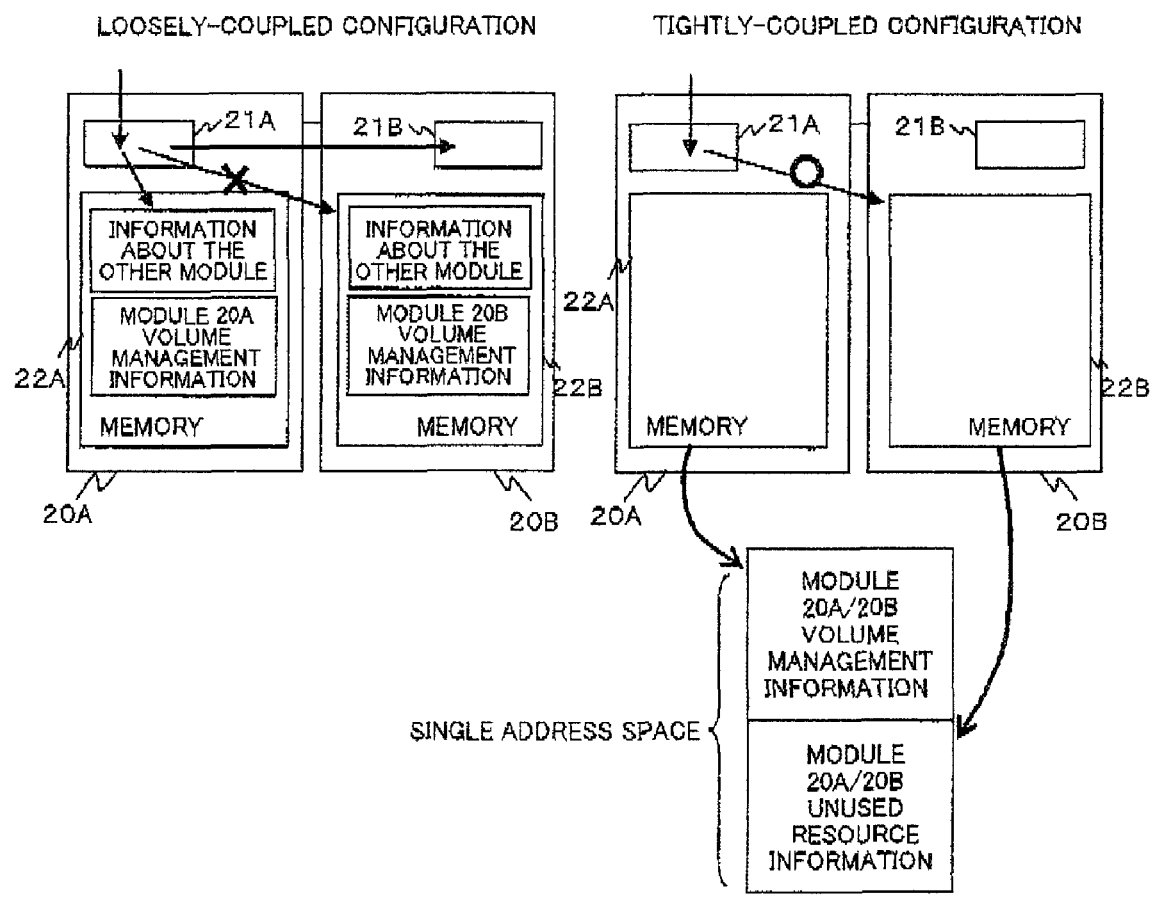

FIG.7

| | | VOLUME MANAGEMENT INFORMATION TABLE 201A | | | | VOLUME MANAGEMENT INFORMATION TABLE 201B | |
|---|---|---|---|---|---|---|---|
| LUN | VOLUME NUMBER | VOLUME MANAGEMENT INFORMATION | SYSTEM ADMINISTRATOR IDENTIFIER | LUN | VOLUME NUMBER | VOLUME MANAGEMENT INFORMATION | SYSTEM ADMINISTRATOR IDENTIFIER |
| 010 | 0 | x x x | Ma#001 | 020 | 0 | x x x | Ma#002 |
| 011 | 1 | x x x | Ma#001 | 021 | 1 | x x x | Ma#002 |
| ... | | | ... | ... | | | ... |
| 01F | n-1 | x x x | Ma#001 | 02F | n-1 | x x x | Ma#002 |

SYSTEM ADMINISTRATOR IDENTIFIER
　　SYSTEM ADMINISTRATOR IDENTIFIER FOR STORAGE SYSTEM 20A : Ma#001
　　SYSTEM ADMINISTRATOR IDENTIFIER FOR STORAGE SYSTEM 20B : Ma#002

FIG.11A

VOLUME MANAGEMENT
INFORMATION TABLE 203A

| LUN | VOLUME NUMBER | VOLUME MANAGEMENT INFORMATION | SYSTEM ADMINISTRATOR IDENTIFIER |
|---|---|---|---|
| 010 | 0 | x x x | Ma#001 |
| 011 | 1 | x x x | Ma#001 |
| ... | ... | ... | ... |
| 01F | n-1 | x x x | Ma#001 |
| 020 | — | — | Ma#002 |
| 021 | — | — | Ma#002 |
| | — | — | ... |
| 02F | — | — | Ma#002 |

VOLUME MANAGEMENT
INFORMATION TABLE 203B

| LUN | VOLUME NUMBER | VOLUME MANAGEMENT INFORMATION | SYSTEM ADMINISTRATOR IDENTIFIER |
|---|---|---|---|
| 010 | — | — | Ma#001 |
| 011 | — | — | Ma#001 |
| | — | — | ... |
| 01F | — | — | Ma#001 |
| 020 | 0 | x x x | Ma#002 |
| 021 | 1 | x x x | Ma#002 |
| ... | | | ... |
| 02F | n-1 | x x x | Ma#002 |

FIG.11B

VOLUME MANAGEMENT
INFORMATION TABLE 205

| LUN | VOLUME NUMBER | VOLUME MANAGEMENT INFORMATION | SYSTEM ADMINISTRATOR IDENTIFIER |
|---|---|---|---|
| 010 | 0 | x x x | Ma#001 |
| 011 | 1 | x x x | Ma#001 |
| | ... | | ... |
| 01F | n | x x x | Ma#001 |
| 020 | n+1 | x x x | Ma#002 |
| 021 | n+2 | x x x | Ma#002 |
| | ... | | ... |
| 02F | 2n | x x x | Ma#002 |

WHEN SUB-STORAGE SYSTEMS ARE COUPLED
TO FORM LOOSELY-COUPLED STORAGE SYSTEM

WHEN SUB-STORAGE SYSTEMS ARE COUPLED
TO FORM TIGHTLY-COUPLED STORAGE SYSTEM

FIG.14

SYSTEM ADMINISTRATOR ACCOUNT INFORMATION TABLE 190A

| USER ID | PASSWORD | ACCOUNT TYPE |
|---------|----------|--------------|
| 001 | ******* | SYSTEM ADMINISTRATOR FOR MODULE 20A |
| | | |
| ... | | |

SYSTEM ADMINISTRATOR ACCOUNT INFORMATION TABLE 190B

| USER ID | PASSWORD | ACCOUNT TYPE |
|---------|----------|--------------|
| 001 | ******* | SYSTEM ADMINISTRATOR FOR MODULE 20B |
| | | |
| ... | | |

FIG.19A

UNUSED RESOURCE INFORMATION TABLE 200

UNUSED PORT INFORMATION TABLE 210A

| PORT NUMBER | AVAILABILITY |
|---|---|
| 001 | IN USE |
|  |  |
| ... |  |

UNUSED HDD INFORMATION TABLE 220A

| HDD NUMBER | AVAILABILITY |
|---|---|
| 0 | IN USE |
|  |  |
| ... |  |

UNUSED PORT INFORMATION TABLE 210B

| PORT NUMBER | AVAILABILITY |
|---|---|
| 001 | IN USE |
|  |  |
| ... |  |

UNUSED HDD INFORMATION TABLE 220B

| HDD NUMBER | AVAILABILITY |
|---|---|
| 0 | IN USE |
|  |  |
| ... |  |

FIG.19B

UNUSED PORT INFORMATION TABLE 211A

| PORT NUMBER | AVAILABILITY | MODULE TO WHICH THE RELEVANT PORT BELONGS |
|---|---|---|
| 001 | IN USE | MODULE 20A |
| ... |  |  |
|  |  |  |
|  |  |  |

UNUSED PORT INFORMATION TABLE 212

| PORT NUMBER | AVAILABILITY | MODULE TO WHICH THE RELEVANT PORT BELONGS |
|---|---|---|
| 001 | IN USE | MODULE 20A |
| ... |  |  |
| 1001 | IN USE | MODULE 20B |
|  |  |  |

UNUSED PORT INFORMATION TABLE 211B

| PORT NUMBER | AVAILABILITY | MODULE TO WHICH THE RELEVANT PORT BELONGS |
|---|---|---|
| 001 | IN USE | MODULE 20B |
| ... |  |  |
|  |  |  |
|  |  |  |

FIG.21A

VOLUME MAPPING MANAGEMENT INFORMATION TABLE 207A

| VOLUME NUMBER | DATA AREA | |
| --- | --- | --- |
| | DATA AREA ADDRESS | SYSTEM ADMINISTRATOR IDENTIFIER |
| 0 | x x x | Ma#001 |
| ... | | ... |
| 1000 | | Ma#002 |
| ... | | |
| n-1 | | Ma#001 |
| | | |

FIG.21B

VOLUME MAPPING MANAGEMENT INFORMATION TABLE 208

| VOLUME NUMBER | DATA AREA | |
| --- | --- | --- |
| | DATA AREA ADDRESS | SYSTEM ADMINISTRATOR IDENTIFIER |
| 0 | x x x | Ma#001 |
| ... | | ... |
| 1000 | x x x | Ma#002 |
| n | x x x | Ma#001 |
| n+1 | x x x | Ma#002 |
| n+2 | x x x | Ma#002 |
| ... | | ... |
| 2n | x x x | Ma#002 |

FIG.22A

501 SCREEN

| VOLUME INFORMATION ABOUT MODULE 20A | |
|---|---|
| VOLUME NUMBER | |
| 0 | |
| 1 | |
| ... | |
| 99 | |

| VOLUME INFORMATION ABOUT MODULE 20B | |
|---|---|
| VOLUME NUMBER | |
| 0 | |
| 1 | |
| ... | ... |
| 99 | |

FIG.22B

501 SCREEN

| VOLUME INFORMATION ABOUT STORAGE SYSTEM 100 | |
|---|---|
| VOLUME NUMBER | |
| 0 | |
| 1 | |
| ... | ... |
| 199 | |

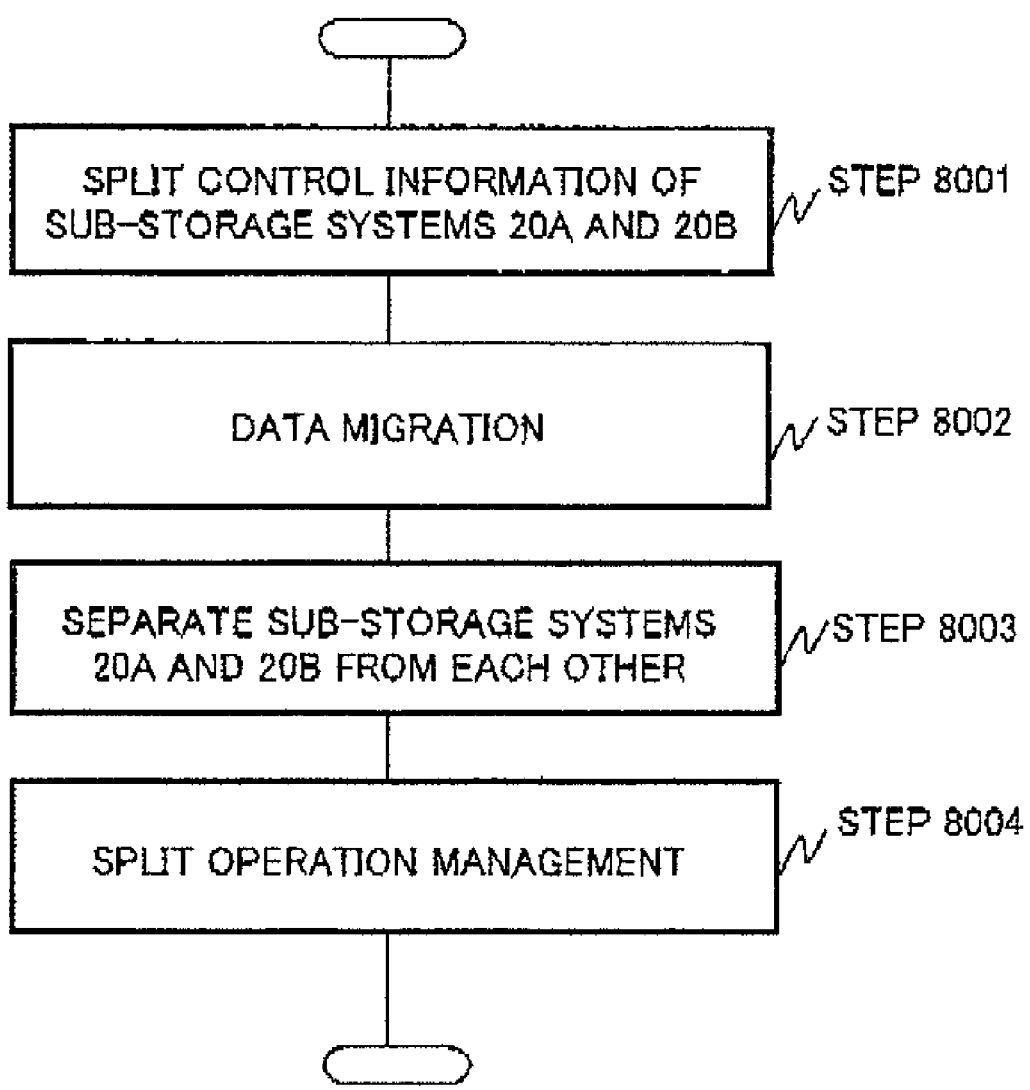

FIG.29

SYSTEM ADMINISTRATOR ACCOUNT INFORMATION TABLE 191

| USER ID | PASSWORD | ACCOUNT TYPE |
|---------|----------|--------------|
| 001 | ****** | SYSTEM ADMINISTRATOR FOR MODULE 20B |
| ... | | |
| 021 | ****** | SYSTEM ADMINISTRATOR FOR MODULE 20A |
| | | |
| 101 | ****** | GENERAL SYSTEM ADMINISTRATOR ✗ |

SYSTEM ADMINISTRATOR ACCOUNT INFORMATION TABLE 190A

| USER ID | PASSWORD | ACCOUNT TYPE |
|---------|----------|--------------|
| 001 | ******* | SYSTEM ADMINISTRATOR FOR MODULE 20A |
| | | |
| ... | | |

SYSTEM ADMINISTRATOR ACCOUNT INFORMATION TABLE 190B

| USER ID | PASSWORD | ACCOUNT TYPE |
|---------|----------|--------------|
| 001 | ******* | SYSTEM ADMINISTRATOR FOR MODULE 20B |
| | | |
| ... | | |

FIG.31

POOL CONTROL INFORMATION TABLE 101

| POOL ID | POOL CAPACITY | POOL REMAINING CAPACITY | POOL REMAINING CAPACITY THRESHOLD | USED VIRTUAL VOL NUMBER | USED POOL VOL QUANTITY | USED POOL VOL NUMBER |
|---------|---------------|-------------------------|-----------------------------------|-------------------------|------------------------|----------------------|
| 0 | | | | | | |
| 1 | | | | | | |
| ... | | | | | | |
| n | | | | | | |

FIG.32

INTEGRATED POOL INFORMATION TABLE 102

| INTEGRATED POOL ID | POOL ID | MODULE NUMBER |
|--------------------|---------|---------------|
| 0 | | |
| 1 | | |
| ... | | |
| n | | |

FIG.35A

THIN PROVISIONING VOLUME CONTROL INFORMATION TABLE 104

| VIRTUAL VOL NUMBER | AREA | ALLOCATED POOL VOL NUMBER | AREA |
|---|---|---|---|
| 242A | 2421A | 248A | 2481A |
|  | 2423A | 248B | 2481B |
|  |  |  |  |
| ... |  |  |  |

FIG.35B

THIN PROVISIONING VOLUME CONTROL INFORMATION TABLE 105A

| VIRTUAL VOL NUMBER | AREA | ALLOCATED POOL VOL NUMBER | AREA | MODULE NUMBER |
|---|---|---|---|---|
| 242A | 2421A | 248A | 2481A | — |
|  | 2423A | — | — | 20B |
|  |  |  |  |  |
| ... |  |  |  |  |

POOL VOLUME CONTROL INFORMATION TABLE 106B

| POOL VOL NUMBER | AREA | ALLOCATED POOL VOL NUMBER | AREA |
|---|---|---|---|
| 248B | 2481B | 242A | — |
|  | 2482B | 242B | 2421B |
|  | ... |  |  |
| ... |  |  |  |

THIN PROVISIONING VOLUME CONTROL INFORMATION TABLE 105A

| VIRTUAL VOL NUMBER | AREA | ALLOCATED POOL VOL NUMBER | AREA | MODULE NUMBER |
|---|---|---|---|---|
| 242A | 2421A | 248A | 2481A | — |
|  | 2423A | —→249A | —→2491A | 20B→— |
| ... |  |  |  |  |

POOL VOLUME CONTROL INFORMATION TABLE 106B

| POOL VOL | | ALLOCATED POOL VOL | |
|---|---|---|---|
| POOL VOL NUMBER | AREA | ALLOCATED POOL VOL NUMBER | AREA |
| 248B | 2481B | 242A | 2423A → UNUSED |
|  | 2482B | 242B | 2421B |
|  | ... |  |  |
| ... |  |  |  |

FIG.42

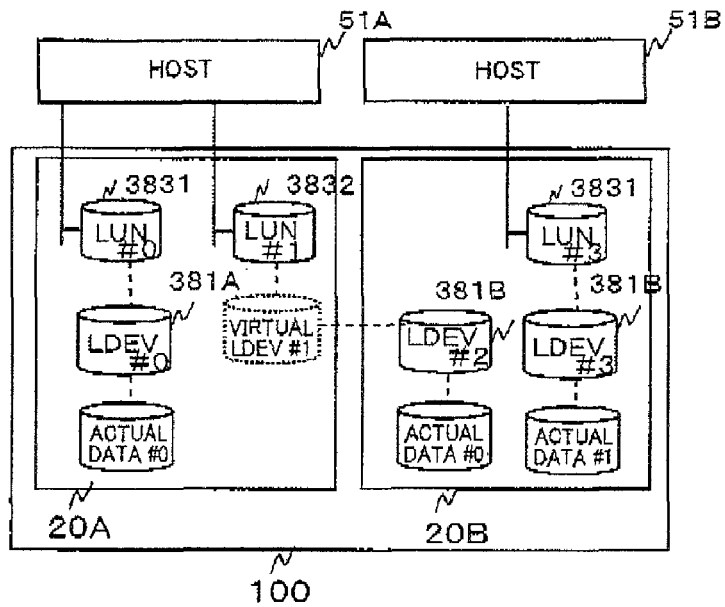

FIG.42A

VOLUME MANAGEMENT INFORMATION TABLE 203A

| LUN | VOLUME NUMBER | VOLUME MANAGEMENT INFORMATION | SYSTEM ADMINISTRATOR IDENTIFIER |
|---|---|---|---|
| 0 | 0 | x x x | Ma#001 |
| ... | | | ... |

VOLUME MANAGEMENT INFORMATION TABLE 203B

| LUN | VOLUME NUMBER | VOLUME MANAGEMENT INFORMATION | SYSTEM ADMINISTRATOR IDENTIFIER |
|---|---|---|---|
| 3 | 3 | x x x | Ma#002 |
| ... | | | ... |

FIG.42B

VOLUME MANAGEMENT INFORMATION TABLE 2031

| LUN | VOLUME NUMBER | USE/DON'T USE RELEVANT VOLUME AS EXTERNAL VOLUME? | EXTERNAL STORAGE UNIT NUMBER | VOLUME NUMBER OF RELEVANT EXTERNAL STORAGE UNIT | VOLUME MANAGEMENT INFORMATION | SYSTEM ADMINISTRATOR IDENTIFIER |
|---|---|---|---|---|---|---|
| 0 | 0 | DON'T USE | – | – | x x x | Ma#001 |
| | 1 | USE | 20B | 2 | x x x | Ma#001 |
| | 2 | – | – | – | x x x | Ma#002 |
| 3 | 3 | – | – | – | x x x | Ma#002 |

REMOTE COPY PAIR MANAGEMENT INFORMATION TABLE 2032

| PAIR NUMBER | MODULE NUMBER | VOLUME NUMBER | MODULE NUMBER | VOLUME NUMBER | STATUS |
|---|---|---|---|---|---|
| 0 | 20A | 0 | 20B | 2 | COPYING |
| | | | | | |
| | | | | | |
| | | | | | |

STORAGE SYSTEM MANAGING INFORMATION IN ACCORDANCE WITH CHANGES IN THE STORAGE SYSTEM CONFIGURATION

CROSS-REFERENCES TO RELATED APPLICATIONS

This application relates to and claims priority from Japanese Patent Application No. 2008-094044, filed on Mar. 31, 2008, the entire disclosure of which is incorporated herein by reference.

BACKGROUND

1. Field of the Invention

The present invention relates generally to a storage system, and particularly to coupling and splitting of a module-type storage system. The invention also relates to a storage system management method.

2. Description of Related Art

In, for example, a database system that handles large-scale data such as on used in a data center, data is managed by using a storage system separate from a host computer. This storage system is composed of, for example, a disk array apparatus. The disk array apparatus can provide the host computer with logical volumes (logical units) formed in storage areas in a plurality of storage devices in response to input/output requests from the host computer.

In a storage system where a disk array apparatus is connected via a communication network to a host computer, the storage system is logically split in accordance with changes in the system configuration (see U.S. Pat. No. 7,069,408).

The above-mentioned function of logically splitting the storage system is based on the premise that storage systems, which are split in one apparatus, are defined and, for example, unused resources (unused disks) are allocated to and used in each split storage system. In other words, no consideration is given to the operation scenario where the storage system is physically split and, as a result, data will be migrated or control information will be split. Also, the possibility of dynamically (online) coupling a plurality of storage housings to each other and operating and managing them as a single storage system is not assumed.

SUMMARY

It is an object of the present invention to provide a storage system capable of managing information in accordance with changes in the storage system configuration.

In order to achieve the above-described object, according to an aspect of the invention, the storage system described below is provided. This storage system is characterized in that when the system configuration is changed, i.e., if a plurality of sub-storage systems are to be coupled to form a storage system, the respective sub-storage systems are physically coupled to each other, and each of the coupled sub-storage systems is managed as a single access target for a host and managed as a single operation target. Also, when the storage system is to be split into a plurality of sub-storage systems, the storage system is physically split into a plurality of sub-storage systems and each of the split sub-storage systems is treated as an individual access target for the host and managed as an independent operation target.

According to an aspect of the invention, information can be managed dynamically in accordance with changes in the system configuration.

Other aspects and advantages of the invention will be apparent from the following description and the appended claims.

BRIEF DESCRIPTION OF THE DRAWINGS

FIG. 6 is an internal configuration diagram illustrating the case where modules are loosely-coupled or tightly-coupled.

FIG. 7 is a configuration diagram of volume management information tables showing the configuration of control information before coupling.

FIG. 11 is a configuration diagram showing volume management information tables for the loosely-coupled configuration and a logical volume management information table for the tightly-coupled configuration.

FIG. 14 is a configuration diagram showing system administrator account information tables before the relevant sub-storage systems are coupled to each other.

FIG. 19 is a configuration diagram showing an unused port information table before and after coupling.

FIG. 21 is a configuration diagram showing a volume mapping management information table in the loosely-coupled configuration and a volume mapping management information table in the tightly-coupled configuration.

FIG. 22 shows display examples of a screen when renumbering a resource number.

FIG. 27 is a flowchart illustrating processing for splitting the storage system into sub-storage systems.

FIG. 29 is a configuration diagram showing system administrator account information tables for explaining splitting of operation management information.

FIG. 31 is a configuration diagram of a pool control information table.

FIG. 32 is a configuration diagram of an integrated pool information table after pools are coupled.

FIG. 35 is a configuration diagram showing thin provisioning volume control information tables and a pool volume control table.

FIG. 42 shows examples of control information tables before (FIG. 42(a)) and after (FIG. 42(b)) the modules 20A and 20B are coupled to each other.

DETAILED DESCRIPTION OF PREFERRED EMBODIMENTS

An embodiment of the present invention will be described below.

Example of System Configuration

Figure 1:
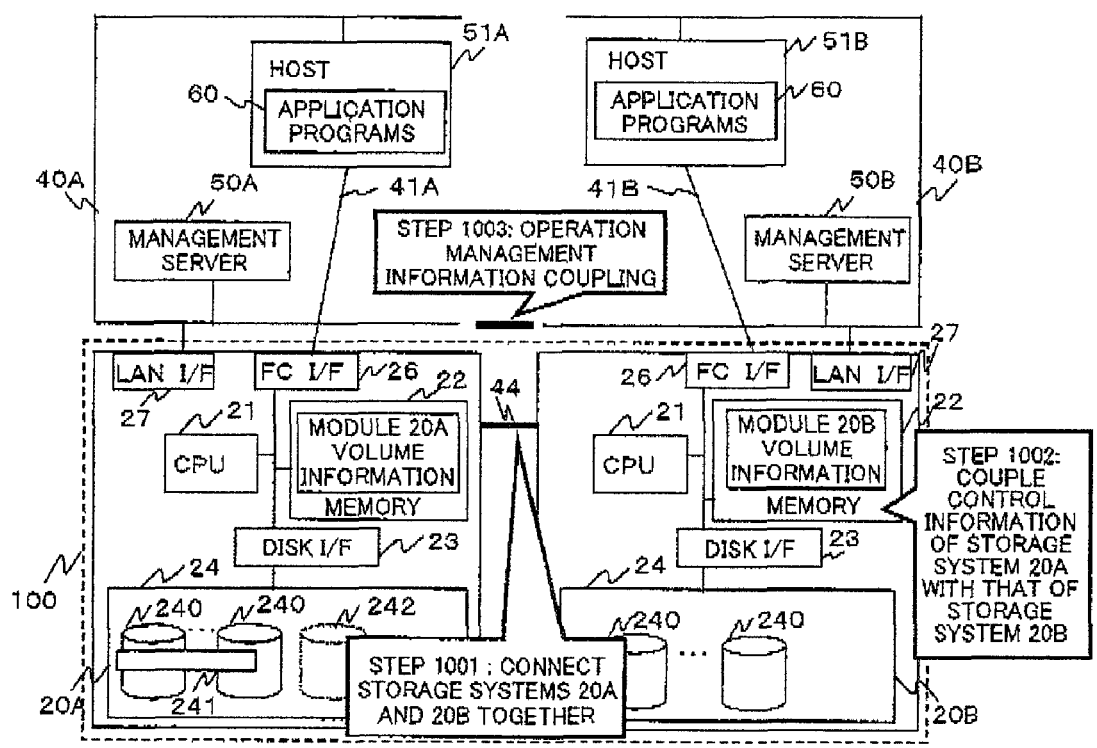
FIG. 1 is a block diagram of a storage system according to this invention.

FIG. 1 shows an example of the entire system configuration according to an embodiment of the present invention. When elements of the same type are explained below without being distinguished from each other, only a parent number (such as "20") is used for explanation; and when the elements of the same type are distinguished from each other for the purposes of explanation, a combination of the parent number and a child symbol (such as "20A" and "20B") is used.

Figure 20:
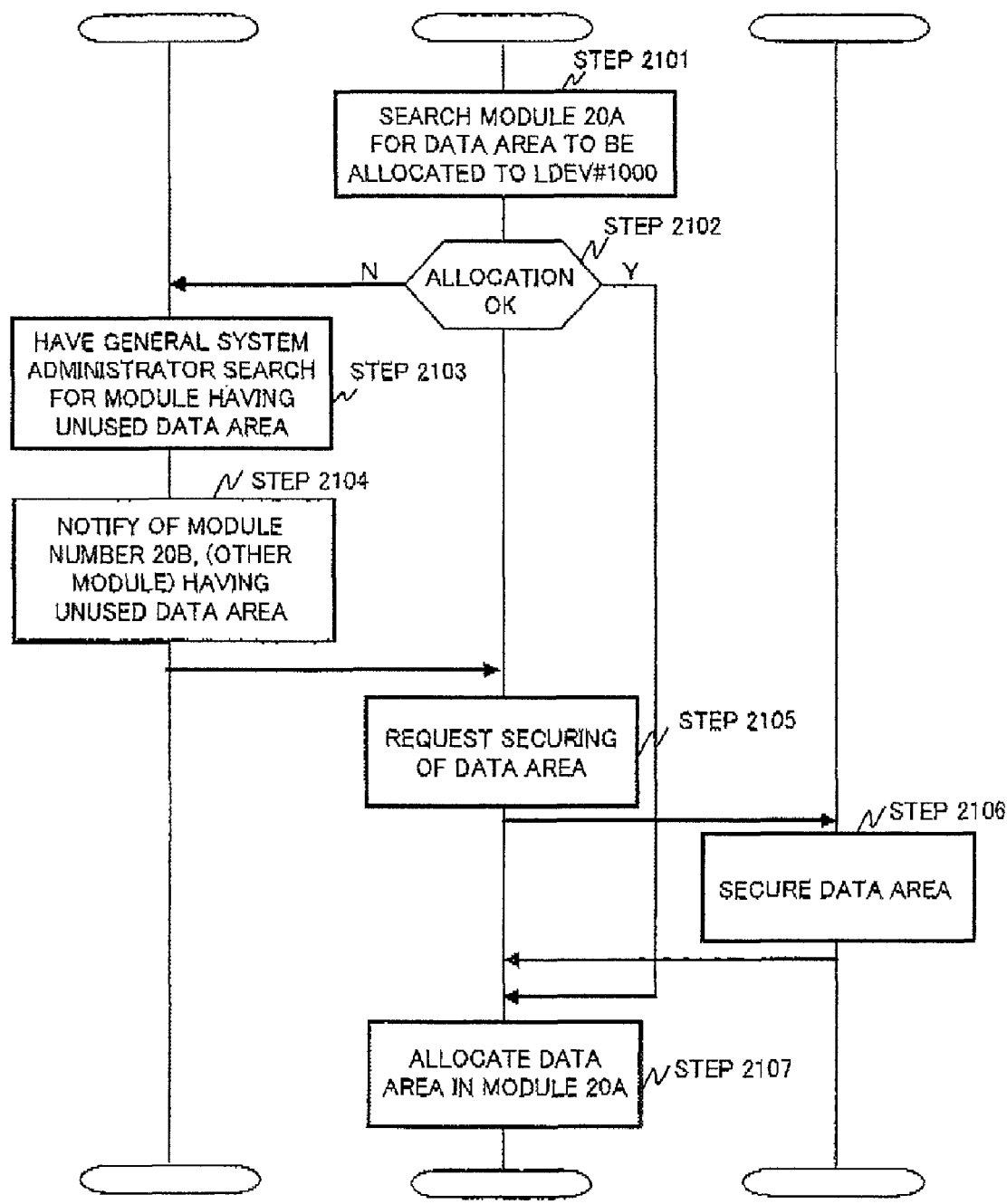
FIG. 20 is a flowchart illustrating a method for allocating unused resources in the loosely-coupled configuration.

Sub-storage systems 20A, 20B are used independently and are coupled by coupling processing shown in FIG. 20 to form a storage system 100. Each host 51 is equipped with a Central Processing Unit (CPU) and storage resources (such as memory) (not shown in the drawing). The storage resources store computer programs and the CPU can execute those computer programs. Whenever a computer program is mentioned as a subject in any sentence in the description below, it is the CPU executing that computer program that is in fact performing the relevant processing.

Sub-storage systems 20A, 20B are connected to hosts 51A, 51B respectively. The host 51A or 51B may be connected to its sub-storage system 20A or 20B via a Storage Area Network (SAN) 41 (see FIG. 3).

Each host 51 has application programs 60. The application programs 60 are business programs such as database management software, Web application software, and streaming application software.

The sub-storage system 20 can be divided roughly into, for example, a control unit and a memory unit. The control unit includes, for example, a Central Processing Unit (CPU) 21, memory 22, a disk interface control unit 23, a Fiber Channel (FC) interface control unit 26, and a Local Area Network (LAN) interface control unit 27. The memory unit is, for example, a disk unit 24.

The CPU 21 executes various control processing in the sub-storage system 20 by executing various programs or modules (which mean micromodules in this context. The memory 22 is a so-called "internal storage apparatus" and includes nonvolatile memory for storing various kinds of modules and volatile memory for temporarily storing the results of arithmetic processing executed by the CPU 21.

The CPU 21 is connected via a disk interface control unit 23 to the disk unit 24. The disk interface control unit 23 serves as a transmission control device to convert a logical address, which is output from the CPU 21, to a Logical Block Address (LBA) and enables the CPU 21 to access a logical device.

The disk unit 24 serves as a storage apparatus and has a plurality of disk drives 240 that are RAID (Redundant Arrays of Independent Inexpensive Disks)-configured. The disk drives 240 are physical devices such as FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SAS (Serial Attached SCSI) disk drives, or SCSI (Small Computer System Interface) disk drives. The physical devices are actual devices having actual storage areas. Incidentally the physical devices are not limited to the disk drives 240, and other kinds of storage devices (such as flash memory) may be adopted.

A virtual LDEV (Virtual Logical Device) 242 is a virtual device that has no actual storage area. In fact, data is recorded in a storage area called a "pool." The pool will be explained later in detail.

The FC interface 26 can control a plurality of disk drives 240 according to the RAID level (such as 0, 1, or 5) specified by the relevant RAID system. In the RAID system, the plurality of disk drives 240 are managed as one RAID group. A RAID group is configured by grouping, for example, four disk drives 240 as one set (3D+1P) or eight disk drives 240 as one set (7D+1P).

In other words, storage areas provided by the respective disk drives 240 are gathered to constitute one RAID group. A plurality of logical devices 241 that are units for access from the host 51 are defined in the RAID group. One or more logical devices 241 are mapped to logical units that are logical storage areas recognized by the host 51. The host 51 can access a logical device 241 by designating the relevant LUN and LBA.

If the sub-storage system 20 can provide the host 51 with a storage area in an external storage system 70 (described later) by being connected to the external storage system 70, the sub-storage system 20 does not always have to be equipped with the disk unit 24 and the disk interface control unit 23.

The FC interface control unit 26 controls commands or data transfer between the sub-storage system 20 and the host 51. SAN may be used between the sub-storage system 20 and the host 51. Fibre Channel protocol or iSCSI protocol may be adopted as the data communication protocol for the SAN.

The LAN interface control unit 27 is connected via a management network 40 to the management server 50. The management network 40 is composed of, for example, Ethernet (registered trademark) cables. The data communication protocol for the management network 40 is, for example, TCP/IP. The management server 50 can manage, for example, creation of LDEVs in the sub-storage system 20, allocation of LDEVs to the host 51, and setting of an access path between the host 51 and the sub-storage system 20 (by means of, for example, LUN masking or zoning).

Figure 2:
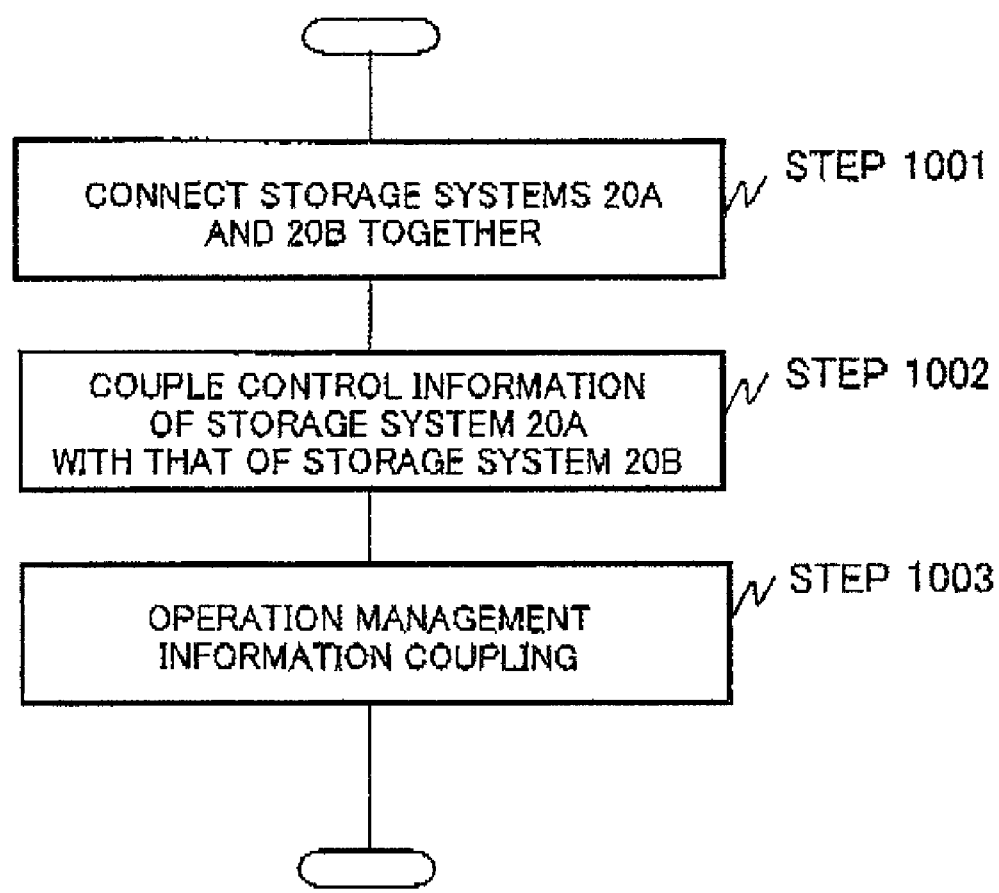
FIG. 2 is a flowchart illustrating a sub-storage coupling method.

If the sub-storage systems 20 are coupled to form a storage system 100 by means of the storage system coupling processing shown in FIG. 2, the sub-storage systems 20 become modules 20; and the modules 20 can transfer commands and migrate logical volumes between them by sending or receiving control information between the modules 20. In the configuration where each module 20 is connected to an external storage system 70 (see FIG. 4), the range of the storage system 100 includes the plurality of modules 20 and external storage systems 70. If not every module 20 is connected to an external storage system 70 respectively, the range of the storage system 100 includes the plurality of modules 20, but not the external storage systems 70.

Each module 20 can be configured as a disk array system including a plurality of disk drives 240 arranged in the RAID configuration, or each module 20 may be configured as a virtualized switch that is a SCSI target. A device that manages hierarchical management identifiers such as LDEV numbers and controls the operation of a storage system can be collectively referred to as a "controller." The controller may exist inside or outside the module.

Figure 3:
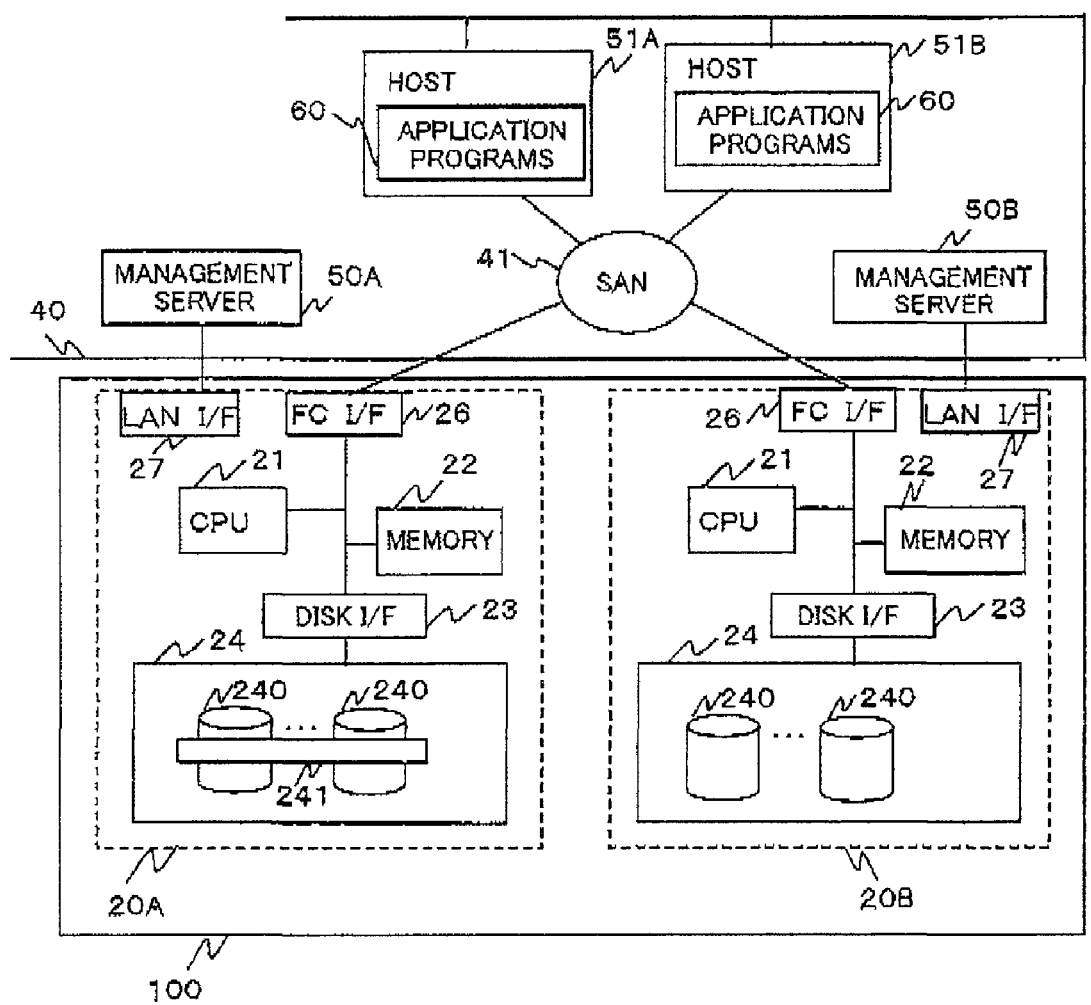
FIG. 3 is a block diagram of a storage system according to the second embodiment of the invention.

The management network 40 is connected to one or more hosts 51. Incidentally, either an outbound system or an inbound system may be employed. In the outbound system, a network (SAN) for issuing commands from the host(s) 51 to each module 20 is different from a network (management network 40) for the management server, 60 to send/receive management information to/from each module 20. As shown in FIG. 3, if the management server 50 is configured to send/receive management information to/from each module 20 via a SAN 41, such a configuration is an inbound system.

A storage system composed of physically separate management servers 50A and 50B has been described above. However, one management server 50 may be provided, and an account for a system administrator ("system administrator account") for the sub-storage system 20A and a system administrator account for the sub-storage system 20B may be created. The following explanation will be given assuming that a system administrator is a management server; but the relationship between them does not always have to be one system administrator versus one management server.

The entire configuration of the system according to this embodiment may be either a mainframe system or an open system, or a combination of those two systems.

Figure 5:
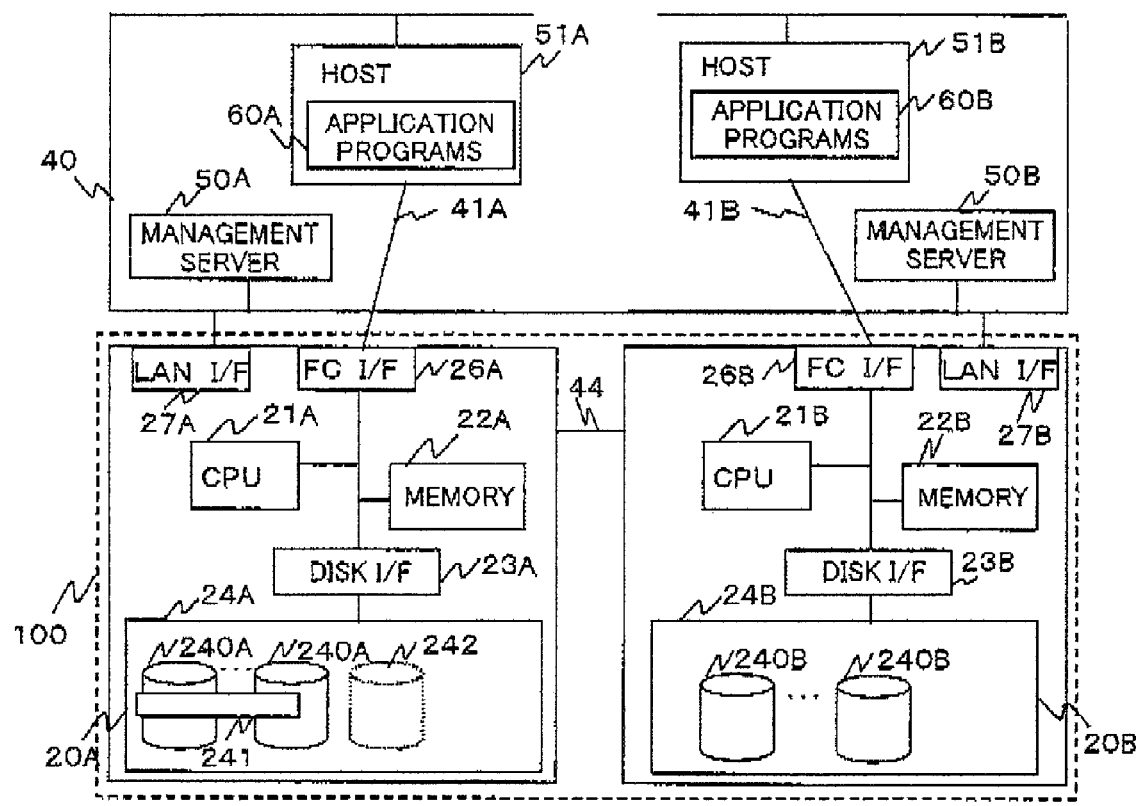
FIG. 5 is a block configuration diagram of the storage system after sub-storage systems are coupled.

Regarding the above-mentioned configuration, a "loosely-coupled configuration" and a "tightly-coupled configuration" are possible, depending on how the modules are controlled. FIG. 5 shows one storage system 100 composed of a plurality of modules.

FIG. 6(a) shows the internal configuration of loosely-coupled modules. Each module 20A, 20B in the storage system 100 has memory 22 and a CPU 21. The memory 22 stores information about resources to be controlled by that module. For example, memory 22A in the module 20A stores a volume management information table 203A for logical volumes controlled by the module 20A. The memory 22A also stores a volume management information table for logical volumes controlled by the other module; however, only a "volume number" and "system administrator identifier" information in those volume management information tables are registered. As the "system administrator identifier," an identifier indicating the module in charge of controlling the relevant logical volume is registered.

FIG. 6(b) shows the internal configuration of tightly coupled modules. Both modules 20A and 20B can refer to both the memory 22A in the module 20A and to the memory 22B in the module 20B. Although the memory 20A, 20B is physically split into the two modules, both the CPU 21A for the module 20A and the CPU 21B for the module 20B recognize the memory 20A, 20B as a single address space.

The entire system according to this embodiment will be described below.

Coupling Sub-Storage Systems

FIG. 2 is a flowchart illustrating the outline of processing for coupling sub-storage systems. FIG. 1 shows an example of the system configuration. The sub-storage systems 20A and 20B shown in FIG. 1 are physically separated and have the same respective configuration. The processing for coupling these sub-storage systems 20A and 20B will be explained below.

The sub-storage systems 20A and 20B are physically coupled to each other via a connection cable (coupling unit) 44. The connection cable 44 may be a dedicated connection cable, a switch mechanism, a network, or a coupling device. As a result, the sub-storage systems 20A and 20B become the storage system 100; and then the sub-storage systems 20A and 20B in uncoupled state will be called "modules," as sub-storage systems logically existing in the storage system 100. Immediately after the sub-storage systems 20A and 20B are coupled to each other, the modules 20A and 20B are in a state in which they are physically separate from each other, have their own physically separate resources, and the respective modules 20A and 20B use their own resources separately (step 1001).

Control information about the module 20A and control information about the module 20B are coupled to each other. When this coupling is performed, management control information is stored in the memory 22 in the module 20 and managed respectively by the modules 20A and 20B as shown FIG. 7. The details of coupling the management control information will be described later (step 1002). Also, programs are added (described later in detail) so that processing required as a result of the above coupling can be executed.

Management integration of the sub-storage systems 20A, 20B is performed. "Management integration" herein means that when the management servers 50A and 50B are integrated with each other, the system administrator for managing the sub-storage system 20A and the system administrator for managing the sub-storage system 20B are integrated with each other (step 1003).

When the processing described above is completed, the storage system 100 is formed and all the resources in the storage system 100 can be utilized, regardless of which range, that of the module 20A or 20B, the resources belong to.

After the sub-storage systems are coupled to each other, the element represented by reference numeral "100" in FIG. 1 becomes the "storage system" and the sub-storage systems 20A and 20B become the "modules." The storage system 100 can be recognized by the hosts 51A and 51B. Specifically speaking, the CPUs 21 for the modules 20A, 20B and the CPUs for the management servers 50A and 50B serve as integrated management units that manage the modules 20A and 20B as a single access target for the hosts 51A and 51B and as a single operation target.

Figure 8:
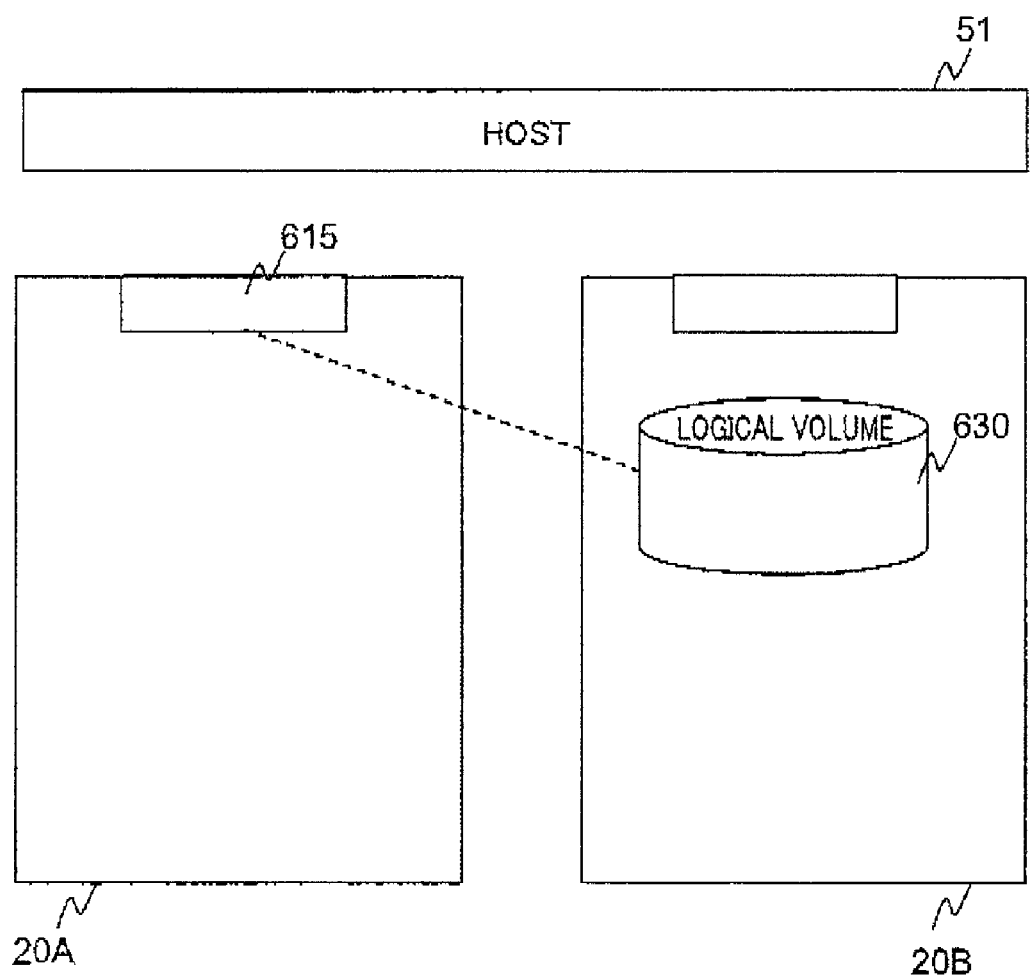
FIG. 8 is a configuration diagram illustrating the configuration in the case where path definition takes place.

In the storage system 100 where the modules are coupled, one or more modules 20A can be recognized as one storage system by the host 51. As a result, if the system administrator defines an I/O path to a logical volume 630 in the module 20B, there is a possibility that a port 616 for the module 20A may be designated (see FIG. 8).

When a user commands the management server 50 to define a path, the path is defined by executing a program (not shown in the drawing) in the management server 50 and a path definition program (not shown in the drawing) in each module 20. The user designates the port number of the port 615 to be used for the management server 50, and the volume number of the target logical volume 630. The execution of the above-mentioned program is realized by having the CPU 21 for the management server 50 execute a program stored in the memory 22. Also, path definition program processing is performed by having the CPU 21 for the module 20 execute the path definition program stored in its memory 22.

Figure 9:
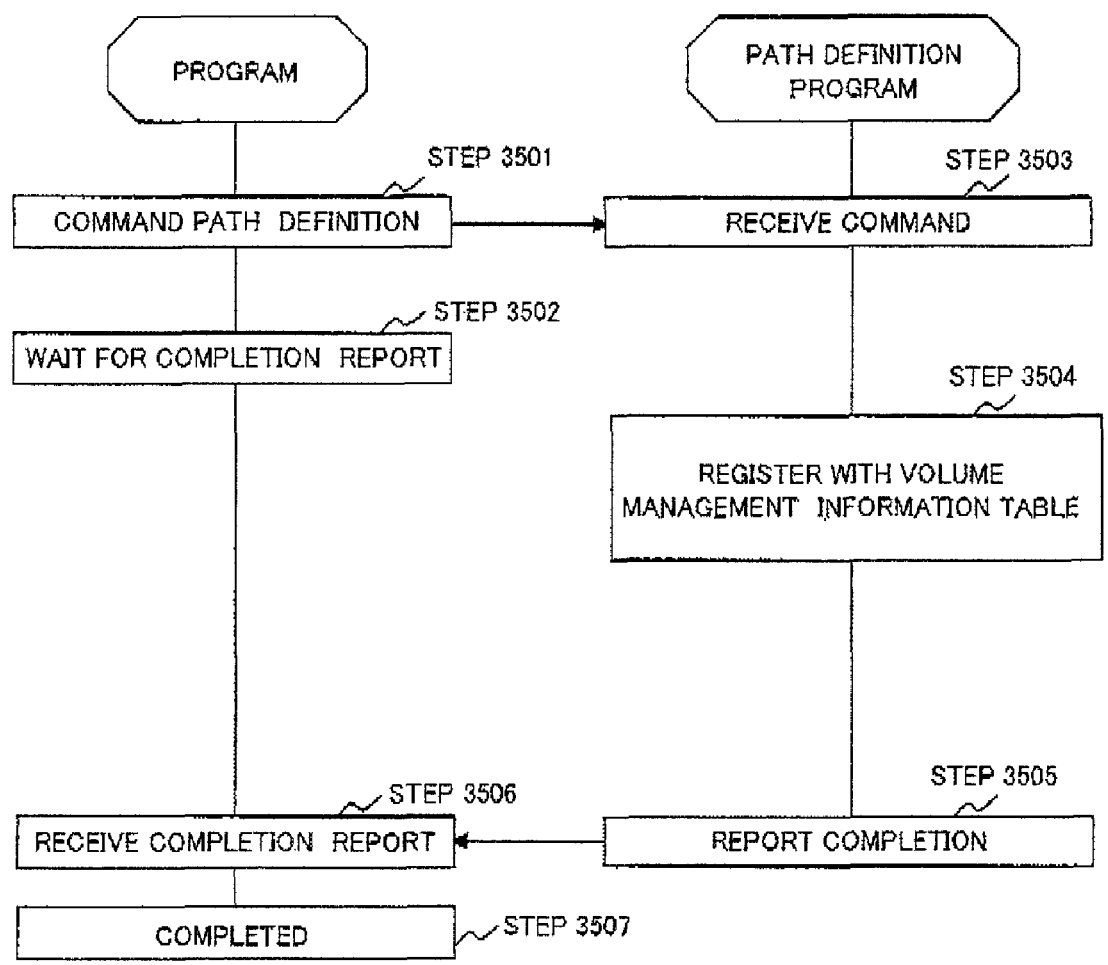
FIG. 9 is a flowchart illustrating path definition processing.

The path definition processing will be described below with reference to the flowchart in FIG. 9. First, the aforementioned program in the management server 50 commands the module 50A having the designated port 615 to define the path (step 3501), and waits for a completion report from the module 20B, which is the designated destination (step 3502). While commanding the path definition, the program in the management server 50 notifies the module 20B of the port number of the port 615 to be used, and the volume number of the target logical volume 630.

The path definition program receives the command (step 3503) and registers information indicating the module 20B with the "system administrator identifier" field of the "LUN" number corresponding to the target port in the volume management information table 203 (step 3504). Then, the path definition program reports completion to the program in the management server 50 (step 3505). Subsequently, the program in the management server 50 receives the completion report from the path definition program (step 3506) and terminates the processing (step 3507).

Processing in Response to Request after Coupling

Figure 10:
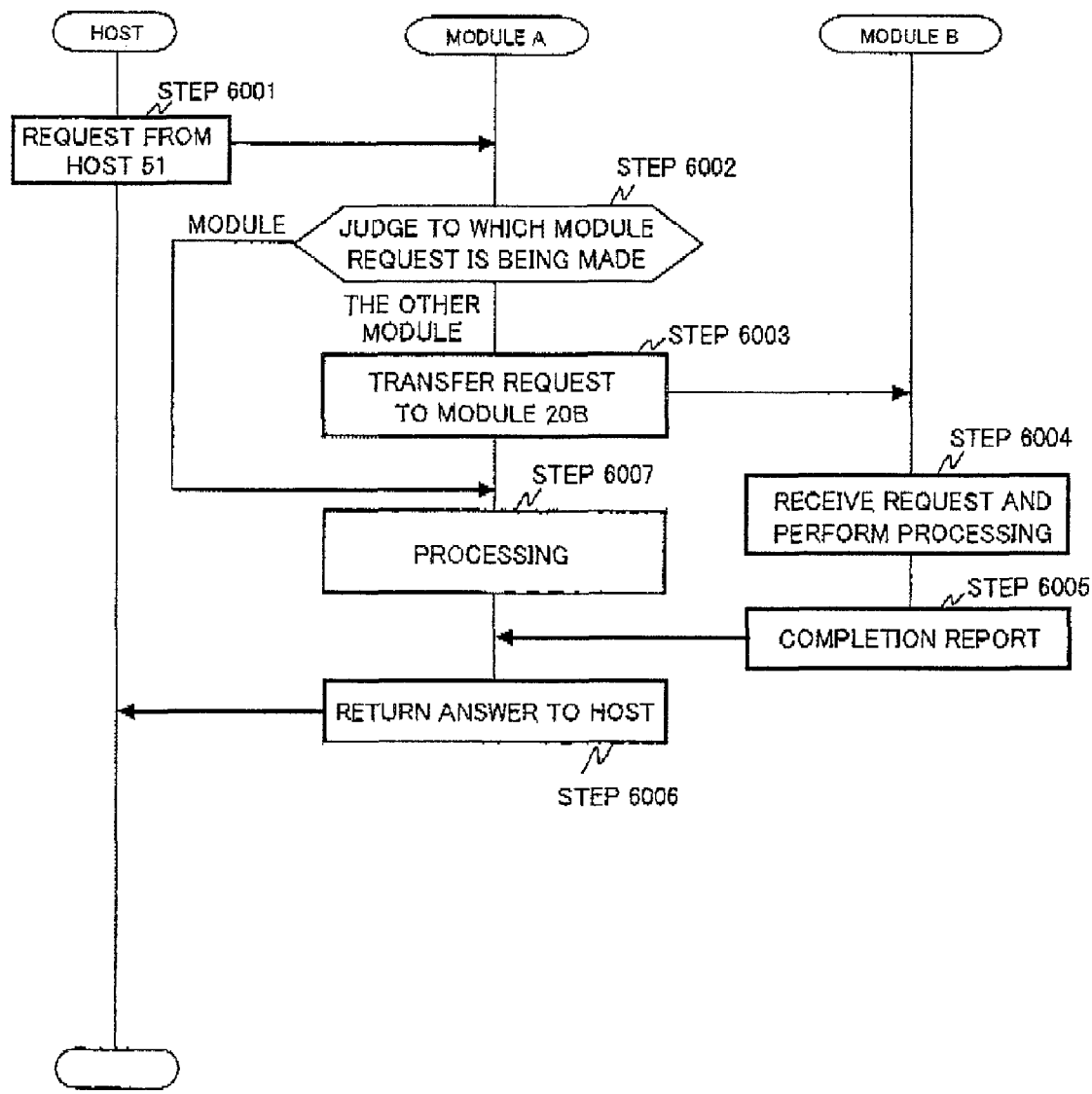
FIG. 10 is a flowchart illustrating processing for the loosely-coupled configuration.

When a Plurality of Modules are Coupled to Each Other to Form a Loosely-Coupled Configuration Next, processing executed in response to a request from the host 51A to the module 20B will be explained below with reference to the flowchart in FIG. 10. After the host 51A makes a request to the module 20B, the request from the host 51A is input to the module 20A; and when the module 20A receives the request from the host 51 (step 6001), it judges to which module the request is being made (step 6002). FIG. 11(a) shows how control information is stored in the case of the loosely-coupled configuration. The relevant tables will be described later in detail.

The module 20A refers to a volume management information table 203A in its own memory 22A and then judges whether the LUN requested by the host 51A belongs to itself or the other module. If the LUN is "010," the system administrator identifier indicates the module 20A and, therefore, the module 20A determines that the request is made to itself. If the LUN is "020," the module 20A determines that the request is made to the module 20B.

If the module 20A determines that the request is made to the module 20B, the module 20A transfers the request to the module 20B (step 6003). After receiving the request, the module B starts processing (step 6004). When the processing is completed, the module 20A receives a completion report from the module 20B (step 6005) and returns an answer to the host 51A (step 6006).

If the module 20A determines in step 6002 that it should execute the processing, the module 20A starts the processing (step 6007). Incidentally, if the host 51B makes a request to the module 20A, the processing should be executed in the same manner, but the module receiving the request and the module executing the processing are reversed (compared to the above-described case).

The above-described embodiment shows the case where the two sub-storage systems 20A, 20B are coupled to form one storage system 100; however, the same processing will be executed when a plurality of (more than two) sub-storage systems are coupled to form one storage system. In this case, a network 40A and a network 40B may be either connected or not connected to each other. In the case of the plurality of sub-storage systems 20A, 20B, and 20C, a connection cable 44 may be provided between the sub-storage systems 20A and 20B and between the sub-storage systems 20B and 20C, and the connection cable 44 may be provided between all the sub-storage systems 20A, 20B, 20C.

Figure 12:
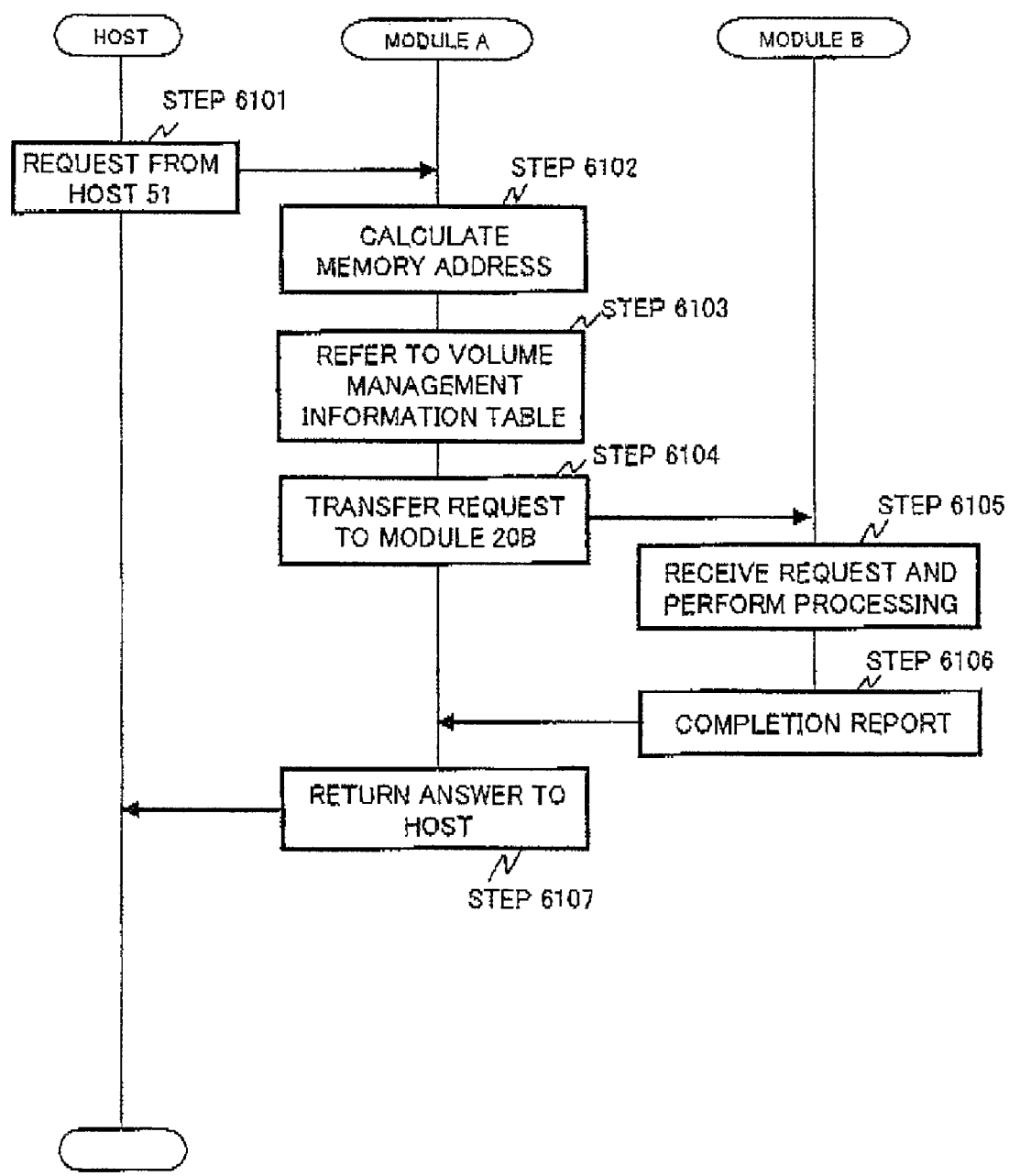
FIG. 12 is a flowchart illustrating processing for the tightly-coupled configuration.

When a Plurality of Modules are Coupled to Each Other to Form a Tightly-Coupled Configuration Processing for coupling a plurality of modules to each other to form a tightly-coupled configuration will be explained below with reference to the flowchart in FIG. 12. When the module 20A receives a request from the host 51 (step 6101), the module-20A calculates the address position where the requested LUN information is stored. For example, each module stores the starting address of the location where the volume management information table is stored, calculates based on the LUN at what number (=N), as counted from the starting address, the relevant information is located, and then calculates, the address of the location where the target information is stored as the "starting address+N" (step 6102). Regarding this processing, FIG. 11(b) shows an example of how the control information is stored in the tightly-coupled configuration. The relevant tables will be described later in detail.

The module 20A refers to a volume management information table 205 in the memory 22A and judges whether the LUN requested by the host 51A belongs to itself or the other module (step 6103). If the LUN is "010," the system administrator identifier indicates the module 20A and, therefore, the module 20A determines that the request is made to itself. If the LUN is "020," the module 20A determines that the request is made to the module 20B. At this point in time, if the module 20A determines that the request is made to the module 20B, the module 20A transfers the request to the module 20B (step 6104). After receiving the request, the module 20B starts the processing (step 6105). When the processing is completed, the module 20A receives a completion report from the module 20B (step 6106) and returns an answer to the host 51A (step 6107). If the host 51B makes a request to the module 20A, the processing should be executed in the same manner, but the module receiving the request and the module executing the processing are reversed (compared to the above-described case).

The coupled volume management information table 205 exists at some address in the single address space. The above-described example shows the processing for the case where the volume management information table 205 is stored in the memory 22A in the module 20A. However, the volume management information table 205 may be stored in the memory 22B in the module 20B or may be distributed and stored in the modules 20A and 20B. Regarding the tightly-coupled configuration, the example in which the module in charge of control executes the read/write processing has been described above; however, that module may refer to the memory in the other module and further execute the processing in response to a request.

Example of Control Information

FIG. 7 shows volume management information tables 201A and 201B, which are an example of control information before being coupled. The sub-storage system 20A stores management information about resources in the sub-storage system 20A, and the sub-storage system 20B stores management information about resources in the sub-storage system 20B. The volume management information tables 201A and 201B are stored in the memory for the modules 20A and 20B respectively.

The volume management information table 201 is composed of an "LUN number" that is an identifier for identifying an LU, a "volume number (=LDEV)" assigned to the LU, and "volume management information" indicating the attributes of the relevant logical volume. The "volume management information" field stores whether the relevant logical volume is being used or not used, and the attributes of the relevant logical volume (such as emulation type, size, and RAID configuration) (not shown in the drawing). The volume management information table 201 further includes an "system administrator identifier" that indicates a module managing the resources. This system administrator identifier is an unique identifier for identifying the relevant module when it is coupled to other modules.

FIG. 7 shows that the volume management information table 201A stores the system administrator identifier indicating the sub-storage system 20A, while the volume management information table 201B stores the system administrator identifier indicating the sub-storage system 20B. As an example of other tables, there is an unused area management table.

Incidentally, the table form has been used as an example, but it is not essential to the present invention, and other forms for storing information may be used.

Coupling Control Information; Details of Step 1002

Next, coupling control information in step 1002 will be explained below by referring to an example of coupling pieces of volume management information shown in FIG. 7.

A volume management information table 203A in FIG. 11(a) is obtained by coupling information in the volume management information table 201A with information in the volume management information table 201B. However, the parts corresponding to the volume management information table 201B indicate information about the relevant LUN number and the relevant system administrator identifier showing a module used by that LUN. The volume management information table 203A is managed by the module 20A. The same can be said for the volume management information table 203B. Regarding LUN-related information about another module indicated by a system administrator identifier, the detailed information is stored in the module indicated by that system administrator identifier. Therefore, the module indicated by the system administrator identifier is referred to acquire the detailed information.

FIG. 11(b) shows another mode of control information management. In this case, the volume management information tables 201A and 201B are integrated with each other to form one volume management information table 206. One volume management information table 205 is held by the storage system 100. As variations, one volume management information table 205 may be held by a specific module 20 in the storage system 100 or by the entire management server 50.

Regarding the volume number in the volume management information table 205, the numbers used in the relevant logical storage system may be used without any change, or may be renumbered serially for the storage system 100.

FIG. 11(a) shows the case of a storage system having the loosely-coupled configuration after sub-storage systems are coupled to each other; and FIG. 11(b) shows the case of a storage system having the tightly-coupled configuration after sub-storage systems are coupled to each other.

When the sub-storage systems are coupled to each other, a path needs to be defined in order to have the host 51A recognize a logical volume in the module 20B and make a request to the logical volume in the module 20B.

Loosely-Coupled Configuration

Figure 13A:
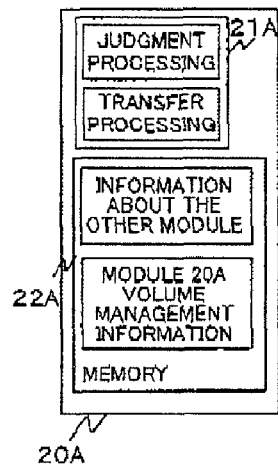
FIG. 13 is an internal configuration diagram showing the case where control information is loosely-coupled or tightly-coupled.

FIG. 13(a) shows the loosely-coupled configuration to which memory information and programs are added. As a result of coupling the sub-storage systems to each other, one module needs to have information about the other module. The module may have information about the other module as shown in FIG. 11(a). As a result of coupling the sub-storage systems, programs for executing processing for judging whether a request is being made to the module itself and for transferring the relevant request to the other module are required.

Tightly-Coupled Configuration

Figure 13B:
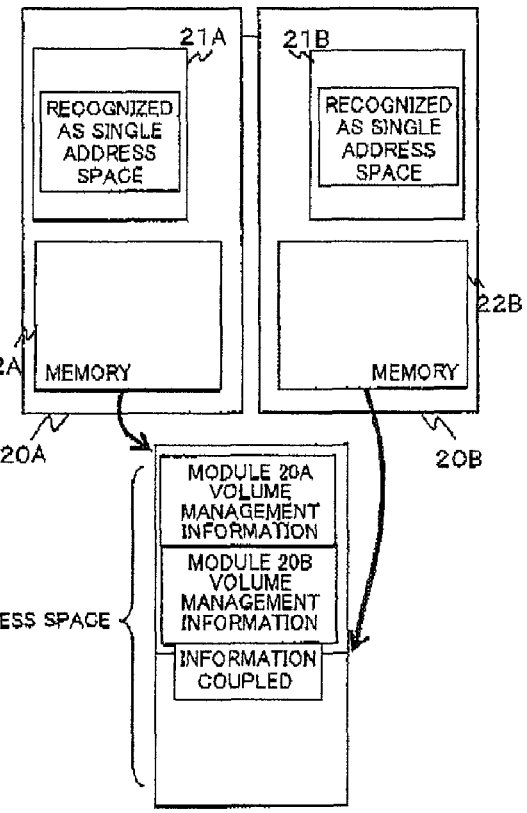

FIG. 13(b) shows the tightly-coupled configuration to which memory information and programs are added. As a result of coupling the sub-storage systems to each other, each module including memory for the other module needs to be recognized as a single address space. For example, control information may be coupled and located in a continuous address space (as a result, the control information can be accessed as shown in an example of step 6102). Also, other methods may be used as long as the starting address of information about each module can be recognized and the address of the location where the required information is stored can be recognized.

Management Coupling; Details of Step 1003

The following explanation will be given based on the premise that each sub-storage system 20A, 20B has its own system administrator. A person who operates the management server 50A (50B) is hereinafter referred to as a "system administrator" of the sub-storage system 20A (20B).

The storage system will have system administrator account information tables. FIG. 14 shows an example of the system administrator account information tables before the sub-storage systems are coupled to each other. A system administrator account information table 190A is stored in the subs storage system 20A (the module 20A after coupling). A "user ID" indicates a system administrator account in the pre-coupled sub-storage system 20A and is a unique identifier within the sub-storage system 20A. A "password" is for the system administrator account to log in to the management server 50A. When accessing the sub-storage system 20A, it is necessary to input the user ID and the password to the management server 50A. An "account identifier" is indicated as the sub-storage system 20A (or the module 20A) in the case of the system administrator account table 190A.

In the same manner, the sub-storage system 20B will have a system administrator account information table 190B.

When the sub-storage systems 20A and 20B are coupled to each other, there are three variations of how to integrate the system administrator accounts as follows:

(1) Select either one of the system administrator accounts to be the integrated account;

(2) Create a new system administrator account for the coupled storage system; or (3) Make the respective system administrator accounts effective in the range of their own modules.

Figure 15:
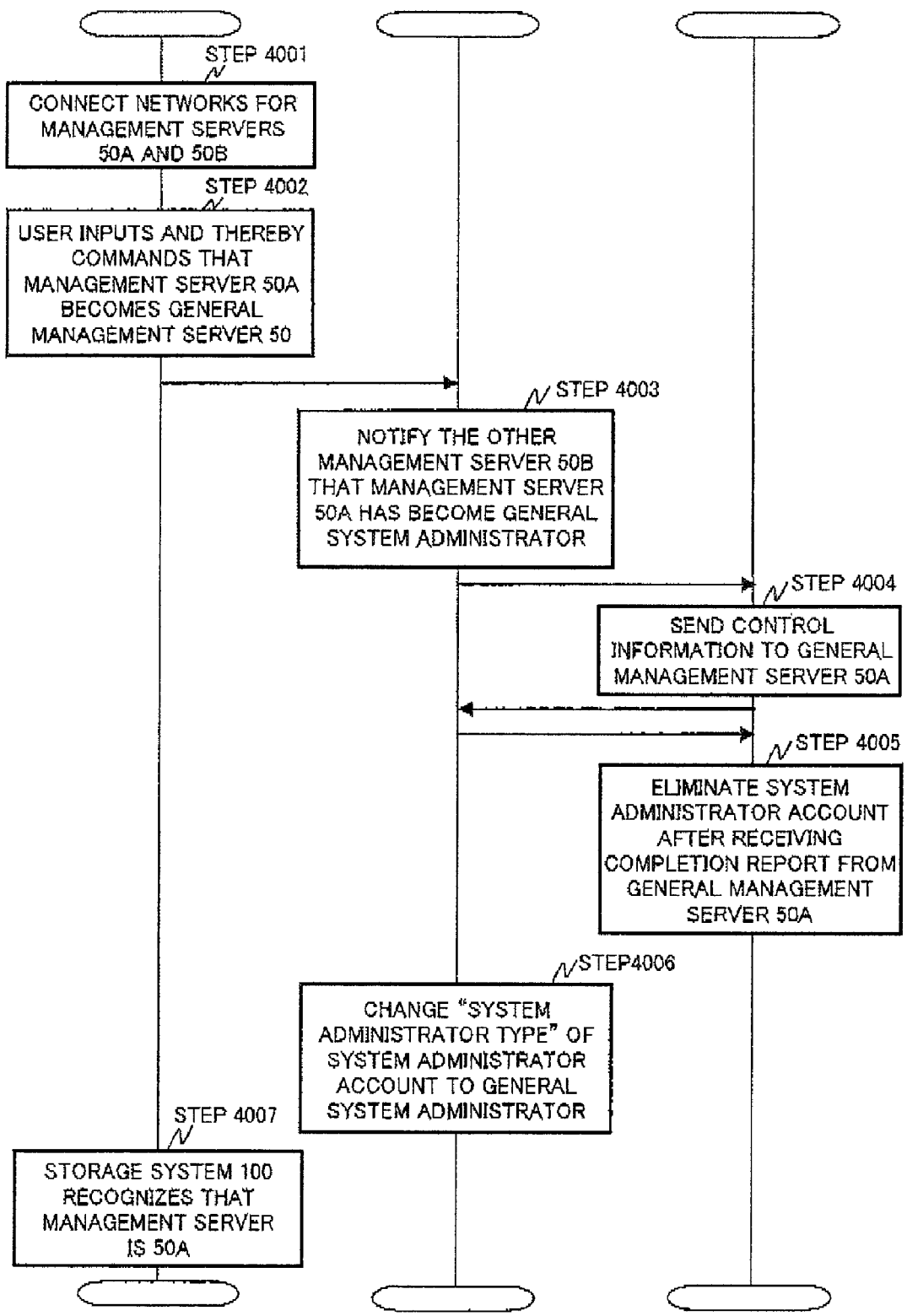
FIG. 15 is a flowchart illustrating processing for coupling system administrator accounts.

(1) Case where the Management Server 50A is Kept and the Management Server 50B is Eliminated After the sub-storage systems 20A and 20B are coupled to each other to form the storage system 100, one system administrator is set to manage the entire storage system 100. An example in which the management server 50A is kept and the management server 50B is eliminated will now be explained below by following the flowchart in FIG. 15.

Figure 16A:
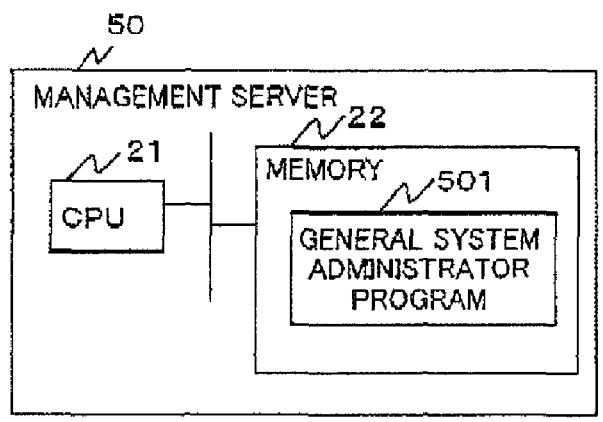
FIG. 16 is an internal configuration diagram showing the case where the system administrator accounts are coupled to each other.
Figure 16B:
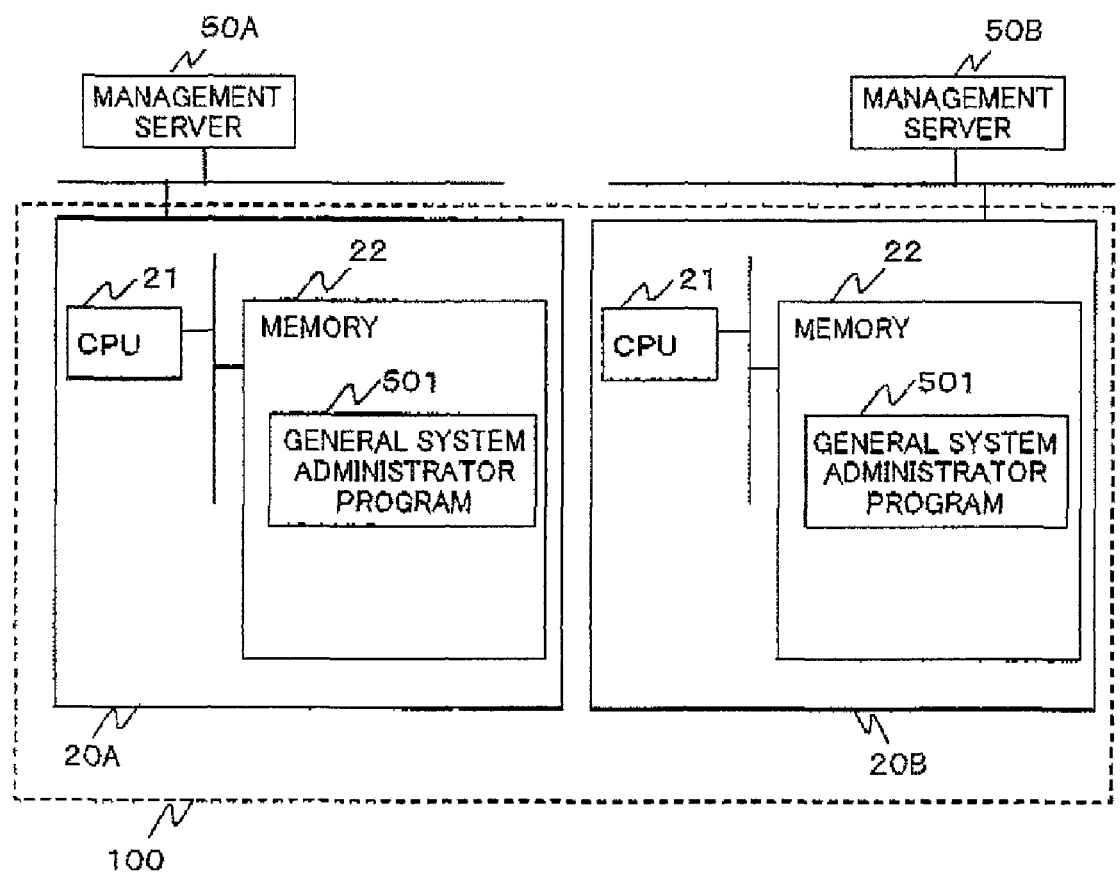

Networks for the management servers 50A and 50B are connected (step 4001). If the management servers 50A and 50B are originally located on the same network, the processing proceeds to step 4002. The management servers 50A, 50B store a general system administrator program 501 that makes the management servers 50A, 50B serve as a general management server 50 when the sub-storage systems are coupled to each other (FIG. 16(*a*)). Alternatively, the general system administrator program 501 is stored in the memory for each sub-storage system 20A, 20B and sent to the management server when the sub-storage systems 20A and 20B are coupled to each other (FIG. 16(*b*)).

The user inputs a command directing the management server 50A to become a general management server 50 (step 4002). After receiving the command, the management server 50A activates the general system administrator program 501 and notifies the other management server 50B that the management server 50A has become the general system administrator (step 4003). After receiving the notice, the management server 50B recognizes that it will not become the general system administrator, and the management server 50B then sends control information managed by itself to the general management server 50A in accordance with a command from the general system administrator 50A (step 4004).

After receiving a receipt completion report from the general management server 50A, the management server 50B switches to a setting in which the system administrator account will not accept inputs from the module 20B or make requests to the module 20B (step 4005). This means that the management server 50B is eliminated. The management server 50B may be left on the network or removed. The system administrator type for the system administrator account for the management server 50A is changed to "general system administrator," and the management server 50A is set to be the system administrator in charge of both the module 20A and the module 20B (step 4006). At this point in time, the user ID in the system administrator account information table 190A is kept and the user ID in the system administrator account information table 190B is deleted. The account type in the system administrator account information table 190A is changed from the "system administrator for the module 20A" to the "general system administrator." The storage system 100 recognizes that the management server is 50A (step 4007).

Figure 17:
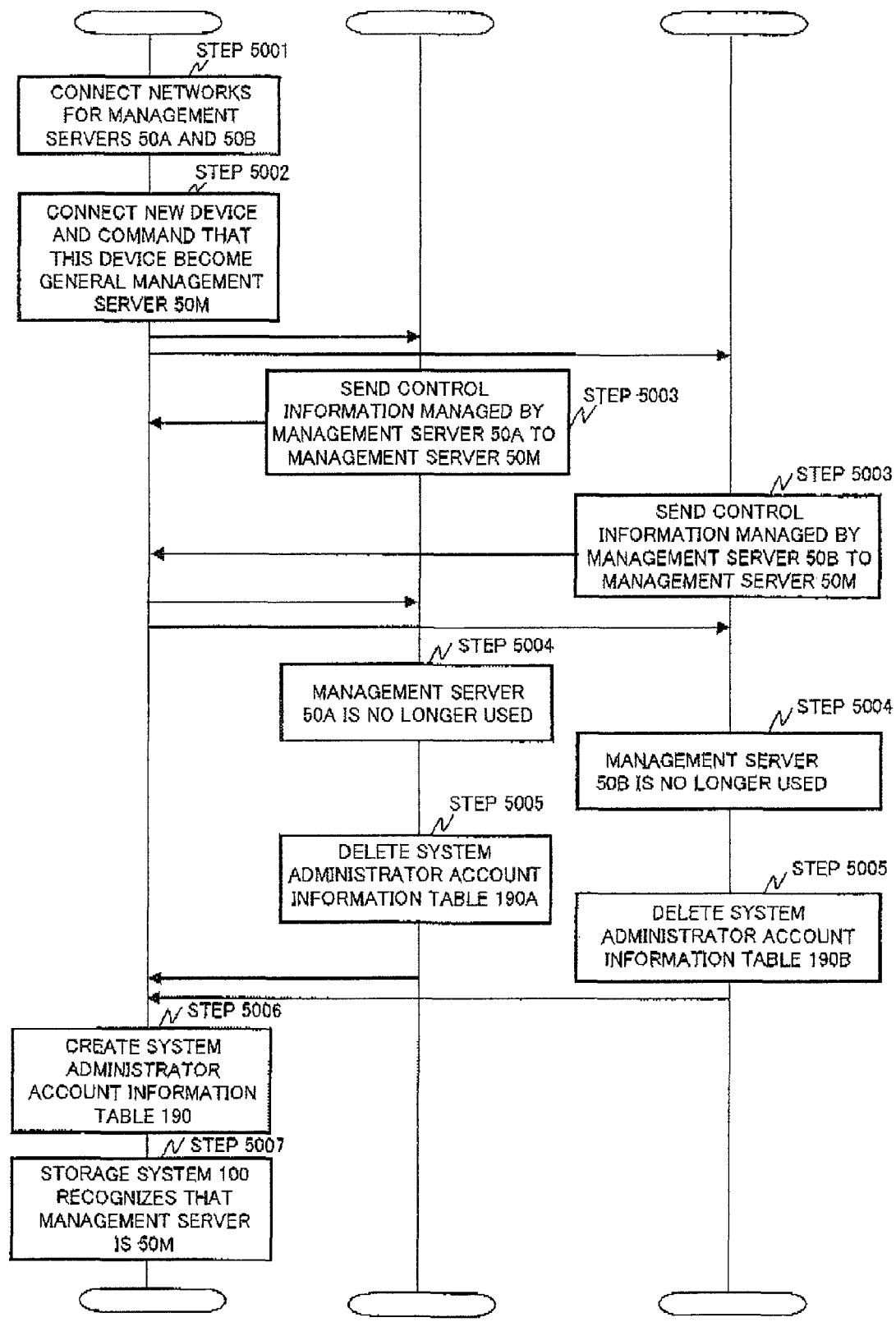
FIG. 17 is a flowchart illustrating processing for coupling the system administrator accounts.

(2) Case Where a New Management Server is Provided and Set to be a General System Administrator Processing for providing a new management server 50M in addition to the management servers 50A and 50B, setting the new management server 50M as a general system administrator for the storage system 100, and having the management server 50M manage the sub-storage systems 20A and 20B will be explained below by following the flowchart in FIG. 17.

Networks for the management servers 50A and 50B are connected to each other (step 5001). If the management servers 50A and 50B are originally located on the same network, the processing proceeds to step 5002.

Next, a new device such as a PC is connected to the network and then set to be the general management server 50M (step 5002). The management server 50M has a general system administrator setting program 501 for making settings for the general system administrator and activates this program. In accordance with a command from the management server 50M, the management servers 50A, 50B send control information, which is managed by the management servers 50A, 50B, to the management server 50M, and the setting is then made so that the management server 50M will generally manage all the control information (step 5003). After receiving the completion of the processing for generally managing all the control information from the management server 50M, the management servers 50A and 50B are separated from the network or set to an unused state (i.e., their system administrator accounts are made invalid or destroyed (step 5004).

At this point in time, the management servers 50A, 50B delete the system administrator account information tables 190A and 190B (delete the user IDs) (step 5005), create a new system administrator account information table 190, and set the account type as "general system administrator" (stop 5006). The fact that the management server for the storage system 100 has become the management server 50M is reported to the storage system 100 (step 5007). The storage system 100 also recognizes the above fact. The management server 50M may be a twin server with switching enabled.

Figure 18:
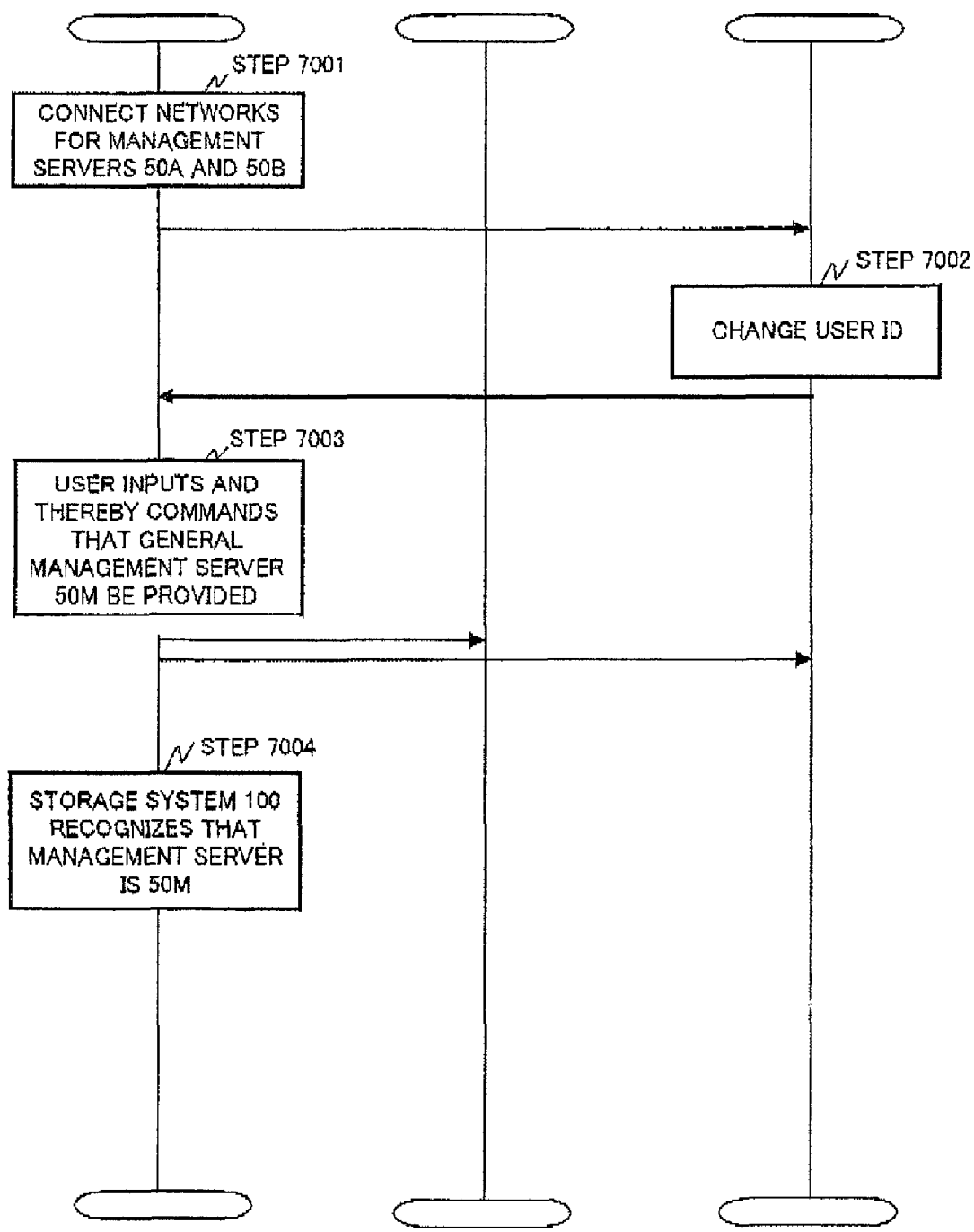
FIG. 18 is a flowchart illustrating another method for coupling the system administrator accounts.

(3) Where the Management Servers 50A and 50B are Effective in the Range of their Respective Modules; Split Storage System Administrators Next, processing to be executed after coupling the sub-storage systems 20A and 20B to each other will be explained below by following the flowchart in FIG. 18. After the sub-storage systems 20A and 20B are coupled to each other (step 7001) and become the storage system 100, the management servers 50A are 508 are left as they are, and the management server 50A (50B) manages information inside 20A (20B) which has become a module. The management server 50A (50B) does not manage resources in the module 20B (20A). Since the system administrator account information tables 190A and 190B are used as they are, the user ID in 190A may sometimes be the same as the user ID in 190B. If there is the same user ID in 190A and 190B, it is necessary to change either one of them to a different user 10. In this example, the user ID in 190B is changed (step 7002).

Since a general system administrator that manages the entire storage system is required, the general system administrator is provided before coupling the sub-storage systems to each other (step 7003). Either of the management servers 50A or 50B may also serve as the general system administrator, or a new management server 50M may be installed on the network 40 as the general system administrator.

An example of integration of the management accounts includes integration of cipher keys. Conventionally, a cipher key is set on a logical volume basis or on a storage system basis. An example in which different cipher keys are set on a storage system basis, that is, for the sub-storage systems 20A and 20B, and in which the sub-storage systems 20A and 20B are coupled to each other to form the storage system 100 will now be explained below. The system administrator account has cryptographic information such as a cipher key about the module in its charge.

When the sub-storage systems are coupled to each other, the general system administrator for the storage system 100 recognizes and manages both the cipher key for the sub-storage system 20A and the cipher key for the sub-storage system 20B. Alternatively, a new cipher key is reset to the storage system 100 in order to integrate the cipher keys, and the general system administrator for the storage system 100 recognizes and manages that new cipher key. On the other hand, in the processing (described later in detail) for splitting the storage system 100 into the sub-storage systems 20A and 20B, the cipher key needs to be split, so cipher keys are generated and reset for the sub-storage systems 20A and 20B, and the general system administrator for the storage system 100 recognizes and manages those cipher keys.

After coupling the sub-storage systems, the general system administrator manages all the unused resources (free resources) in the storage system 100. FIG. 19 shows examples of unused resource information tables. FIG. 19(*a*) shows tables before coupling the sub-storage systems. An unused port information table 210A and an unused HDD information table 220A are held by the sub-storage system 20A. The unused port information tables have information concerning availability indicating "in use" or "unused" for each port number. The unused HDD information tables also have information concerning availability for each HDD number. In the same manner, an unused port information table 210B and an unused HDD information table 220B are held by the sub-storage system 20B. The port number and the HDD number are unique numbers in their relevant sub-storage system 20A or 20B.

When the sub-storage systems are coupled to form the storage system 100 having a tightly-coupled configuration, processing for coupling the unused resource information tables is performed.

FIG. 19(*b*) shows an example in which although the sub-storage systems are coupled to form the storage system 100, two unused port information tables 211A and 211B are kept as they are. Since it is necessary to clarify, based on the pre-coupled unused port information tables, to which module the relevant port belongs, the tables have information about the "module to which the relevant port belongs." Also, the information about the "module to which the relevant port belongs" may be stored in another table separate from the unused port information table 211A.

FIG. 19(*c*) shows an example where the sub-storage systems are coupled to form the storage system 100 and one unused port information table is maintained. If there is one unused port information table, and if both the modules 20A and 20B have the same port number before they are coupled, it is necessary to renumber the port numbers so that the numbers will be unique in the storage system 100 after coupling.

In order to be able to manage all the resources in the storage system 100, the management server 50M receives, from the management servers 50A and 50B, unused resource information that the management servers 50A and 50B had before they were coupled to each other. After the sub-storage systems 20A and 20B are coupled to each other, the system administrators for the management servers 50A, 50B can use all the resources in the storage system 100, including resources in the other module, without regard to which module range the resources belong to.

Allocation of Unused Resources in Loosely-Coupled Configuration

When allocating the resources, a module first searches itself for any unused resource and then allocates the resources. If the resources inside the module itself are insufficient and cannot be allocated, another module having sufficient resources is selected based on unused resource information held by the general system administrator, and then a request for allocation of the resources of that module is sent to that module having the sufficient resources and allocation processing is performed.

The allocation processing will be explained below by following the flowchart in FIG. 20. The allocation of resources will be specifically explained by referring to processing for allocating a data area to LDEV#1000 in the module 20A (see FIG. 21(*a*)).

The module 20A searches itself for a data area to be allocated to LDEV#1000 (step 2101). If the module 20A fails to secure a new data area (step 2102), the module 20A requests that the general system administrator searches for a module having any unused data area (step 2103). If a new data area can be secured, the resources are allocated to the new data area (step 2107). The general system administrator notifies the module 20A of the module number "20B" indicating the other module having an unused data area (step 2104). The module 20A requests that the module 20B secures the data area for LDEV#1000 (step 2105). The module 20B receives the request, secures the data area, and then notifies the module 20A to that effect (step 2106).

Allocation of Unused Resources in Tightly-Coupled Configuration

Resource allocation will be specifically explained below by referring to processing for allocating a data area to LDEV#1000 in the module 20A (see FIG. 21(*b*)).

The module 20A searches for a data area to be allocated to LDEV#1000. In doing so, a table used is shown in FIG. 21(*b*) and any unused data area is selected without regard to the system administrator identifier indicating modules.

In order to avoid allocating the same resource to different modules at the same time, the storage system is controlled so that while the management server 50A is in operation, the other management server 50B is excluded. One control method is that the general system administrator has a bitmap that allows it to recognize the management server in operation; and before starting operation, the management server has the general system administrator set the bit to "1" (the initial state is "0"). Before the management server starts operating, the bit is referred to; if the bit is "1," the other management server cannot operate. When the management server finishes operating, it sets the bit back to "0."

Renumbering of Resource Number

When the modules are coupled to each other, there is a simple method for renumbering the resource numbers in the modules so that the resource numbers will become unique. If the volume numbers are renumbered, the system administrator account is notified to that effect. At the same time, information about which number is renumbered to which number, or a formula for calculating new numbers (such as an arithmetic expression) is also given to the system administrator account. When the system administrator account recognizes the changes in the numbers and displays them on a screen for the user, the user can select either a method of displaying the logical volume numbers on the old module basis (such as the modules 20A, 20B) or a method of displaying the new logical volume numbers which are serial numbers for the storage system 100. FIG. 22 shows screen images.

Figure 23:
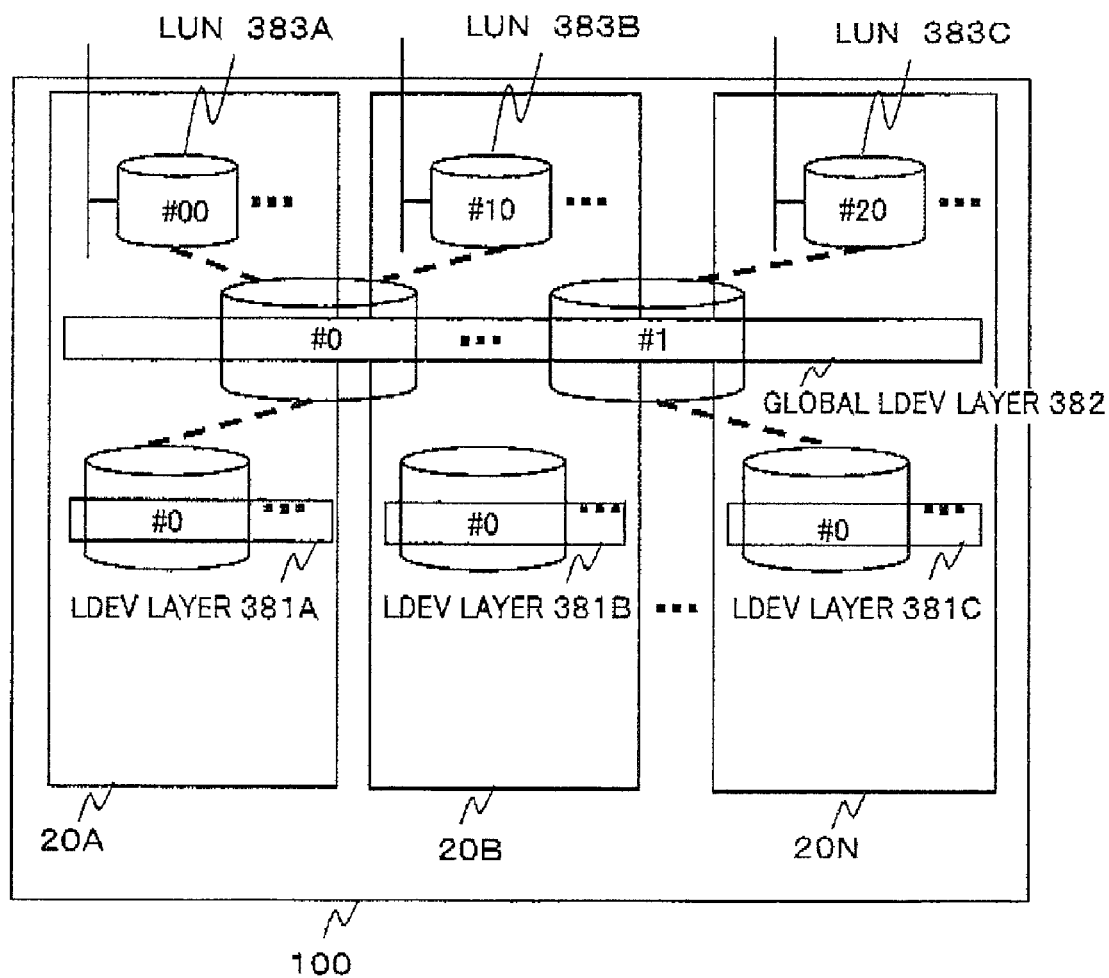
FIG. 23 is a block configuration diagram for explaining renumbering of the resource number.

In another method, a global LDEV layer 382 is provided at a level higher than LDEV layers 381 and at a level lower than LUNs 383 (see FIG. 23). The global LDEV layer 382, unlike the LDEV layers 381, extends across a plurality of modules 20. In other words, the global LDEV managed by all the modules 20 is provided at a level higher than the LDEVs managed by only the individual modules 20. Since the LDEV layers are given unique numbers in each module 20A to 20N, the same LDEV number (which is the same as the volume number mentioned above) may exist in both the modules 20A and 20B.

Since the global LDEV layer is given a unique number in the storage system 100, that number is also unique in each module 20A to 20N. The global LDEV is a virtual LDEV that can be associated with some of the LDEVs in the plurality of modules 20. Also, the global LDEV is associated with the LUNs. The system administrator account uses the number of the global LDEV layer.

Next, variations in operation of the storage system having the coupled configuration will be explained below.

Variation 1; the Host 51A Recognizes the Module 20A, and the Module 20B Constitutes an External Storage System.

In this variation, the host 51A recognizes the module 20A, while it does not recognize logical volumes in the module 20B, but recognizes the module 20B as an external storage system configuration (described later in detail) for the module 20A. Normal read/write processing is almost the same as that of the external storage system configuration. However, in the case of the tightly-coupled configuration, the difference from the external storage system configuration is that the write processing can be executed by having the module 20A directly write data to cache memory in the module 20B.

The above-described operation of "making a module recognized as an external storage system" (how to treat a module) is a publicly-known technique. The important point of the present invention is not only how to make the module recognized, but also how to couple the sub-storage systems to make one of the modules that have respectively been operating as modules recognized as the external storage system configuration, as well as management integration required by the above-described situation. In the case of an external storage configuration of conventional techniques, information about the system administrator for the external storage system is stored in the external storage system, but not on the network 40 shown in FIG. 1. However, the difference between the configuration in this invention and a conventional external storage configuration is that information about the system administrator is stored in all of the module 20A, the module 20B, and the management server 50. As a result, even if the module 20B is set as the external storage system configuration, the present invention has the advantage of being able to realize management integration of the module 20A with the module 20B.

Figure 24A:
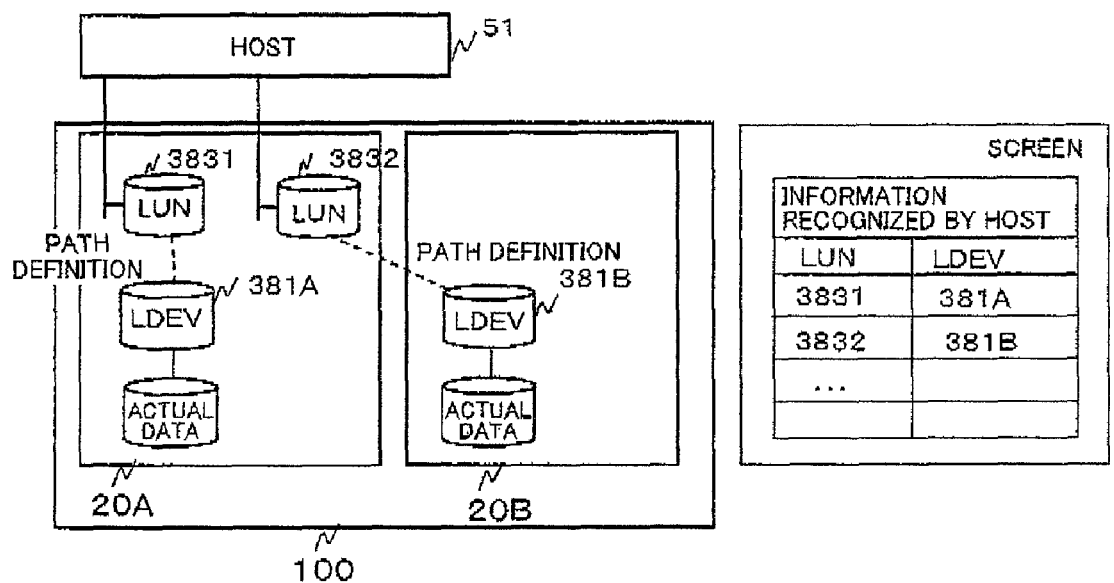
FIG. 24 is a configuration diagram illustrating variations of the coupled configuration.
Figure 24B:
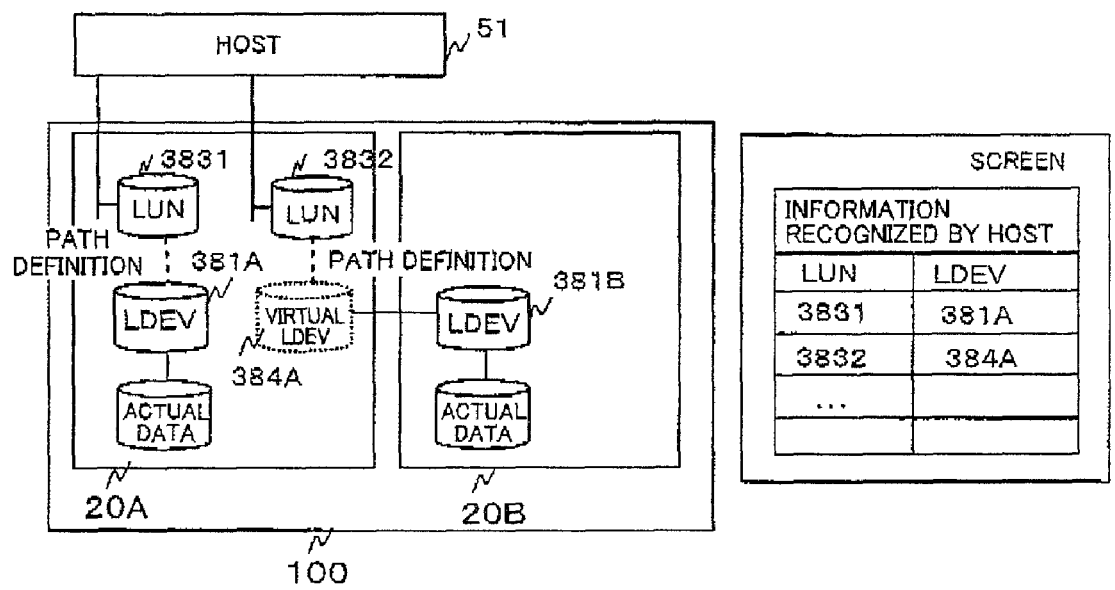

FIG. 24(a) shows the coupled configuration described earlier, and FIG. 24(b) shows variation 1. In the coupled configuration, there is a possibility that a path may be defined across the plurality of modules, and the host can also recognize LDEV information of the module 20B. In the variation 1 configuration, the path definition is performed only with the module 20A, and LDEV information that can be recognized by the host 51 is a virtual LDEV in the module 20A and LDEV information in the module 20B for which the virtual LDEV is allocated cannot be recognized. FIG. 24 also shows screen images of the two configurations on the management server 50.

FIG. 42 shows an example of control information tables before (FIG. 42(a)) and after (FIG. 42(b)) coupling the modules 20A and 20B to each other. The module 20A has a volume management information table 203A, and the module 20B has a volume management information table 203B. After coupling the modules 20A and 20D together, the volume management information results in a volume management information table 2031 shown in FIG. 42(b).

The table 2031 is obtained by adding, to the information in the tables 203, information about "use/don't use the relevant volume as an external logical volume"; and if the relevant volume should be used as an external logical volume, information about an "external storage unit number to be virtualized and a "volume number of the relevant external storage unit" which is the volume number on the external storage unit side is also added. FIG. 42(b) shows an example of the tightly-coupled configuration. The host 51A can recognize the volume numbers #0 and #1 in the table 2031, but cannot recognize the volumes #2 and #3. The host 51B can recognize the volume number #3, but cannot recognize the volumes #0, #1, and #2.

Variation 2: Variation 1+Aforementioned Coupled Configuration

While the host 51A can recognize the respective modules 20A and 20B, the host 51B can recognize the modules in the way described in variation 1, that is, the host 51B can recognize the module 20B, but cannot recognize logical volumes in the module 20A, and recognizes the module 20A as an external storage system configuration for the module 20B.

Figure 25:
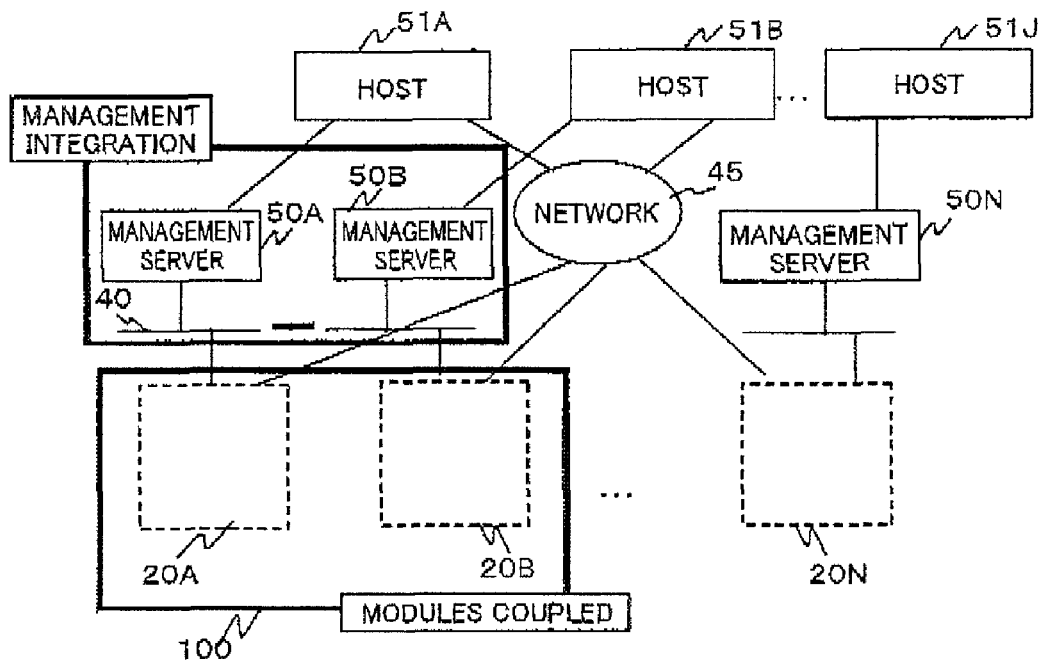
FIG. 25 is a configuration diagram illustrating coupling of sub-storage systems on the network.

Variation 3: Coupling Storage Systems on Network (see FIG. 25)

A plurality of modules 20A to 20α exist on the network, and some arbitrary ones of them are coupled or split. Since they are located on the network, variation 3 has the advantages of no restriction on the distance between the respective modules 20 and the capability of freely designing the configuration. In the case of the aforementioned loosely-coupled configuration, an even more flexible configuration is possible. Since the control information is normally held by each module 20, when the modules 20A and 20B are integrated with each other, the control information of both the modules 20A and 20B is coupled together by either the "tightly-coupling method" or "loosely-coupling method" described above.

Figure 26:
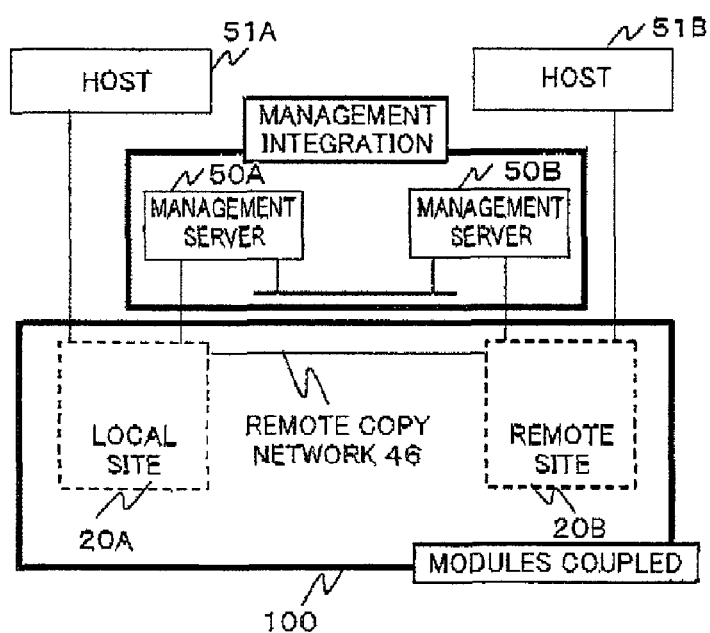
FIG. 26 is a configuration diagram illustrating coupling of sub-storage systems, which is used for repeat copy connection.

Variation 4: Coupling Storage Systems Used for Remote Copy Connection (see FIG. 26)

A storage system at a local site and a storage system at a remote site for remote copying are coupled to each other, and their system administrator information is also integrated. After the storage systems are coupled together, the remote copy processing is continuously performed as post-coupling internal storage system copying. Variation 4 has the advantage of capability of management integration between the local site and the remote site for remote copying. For the purpose of management integration, the management servers 50A and 50B may be connected to each other via a network, or both a local-site system administrator account and a remote-site system administrator account may be created for either the management server 50A or 50B. Also, a general system administrator is provided, and integrated management of the module 20A information and the module 20B information such as the aforementioned cipher keys is conducted.

Figure 43:
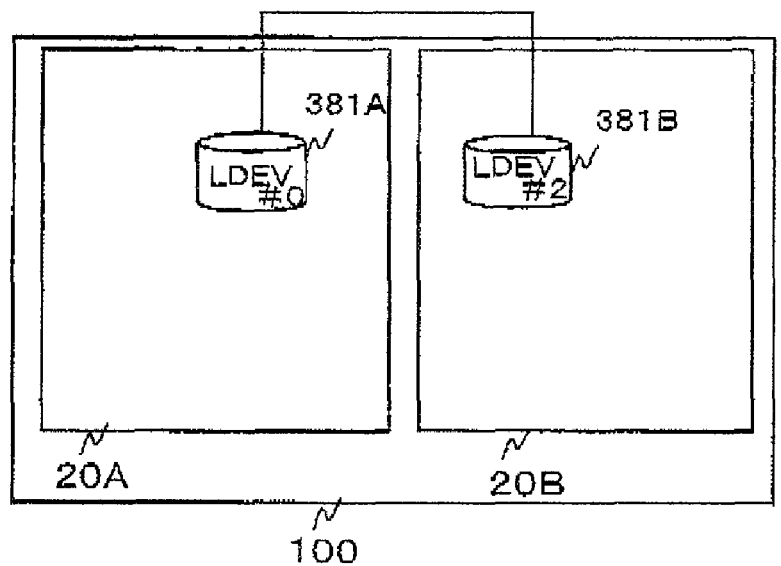
FIG. 43 shows a block diagram and a table showing an example of the modules 20A and 20B after they are coupled to each other.

Volume pair information and remote copy control information, such as the copy status for the relevant pair, are held by the local site for remote copying. As a result of the module integration, the above-mentioned control information is shared by the local site and the remote site. The remote copy pair information includes a module number and a volume number. In the example show in FIG. 43 where the modules 20A and 20B are coupled to each other, a remote copy pair management information table 2032 indicates that a pair of the pair number #0 consists of the volume number #0 in the module 20A and the volume number #2 in the module 20B, and that the pair status showing the pair is being "remote-copied."

The above-described variations show an example where there are two modules; however, the same variations apply when there are three or more modules. Also, the host 51A is mentioned as an example, but the same can be said for the host 51B.

Storage System Split

FIG. 27 is a flowchart illustrating the outline of processing for splitting a storage system. The processing for physically splitting the storage system 100 shown in FIG. 1 into the sub-storage systems 20A and 20B will be explained below.

The storage system 100 may or may not have a system configuration of the modules 20A and 20B coupled to each other in advance. If the storage system 100 does not have the system configuration of the coupled modules 20A and 20B, processing for determining which resource should be placed under the control of which module is performed when splitting the storage system 100. Specifically speaking, the storage system 100 may be, split according to the LDEV number. Alternatively, the storage system 100 may be split according to the path number; in this case, once the module number to which the relevant path belongs is determined, the LUN associated with the path also belongs to the same module, and the LDEV number assigned to the LUN also belongs to the same module.

Immediately after starting the split processing, processing for allowing the sub-storage systems 20A, 20B to utilize only the resources within their own range is required. Specifically speaking, if one storage system attempts to utilize a resource in the other storage system, this attempt results in an error.

Meanwhile, the control information is split in order to be divided for the sub-storage systems 20A and 20B. The control information is set inside the sub-storage systems 20A and 20B respectively (step 8001). Also, identifiers (meaning the "module numbers" here) corresponding to the split units (meaning the "modules" here) are set for the sub-storage Systems 20A and 20B respectively. The module numbers will be hereinafter referred to as "20A" and "20B."

If any part of the storage system 100 cannot be split into the sub-storage systems 20A and 20B, the relevant data is migrated so that the relevant part can be physical split (step 8002). Data migration will be required in cases where a logical resource and actual data are stored in different modules, or where the relevant data is stored across the physical boundary that is to be set. There is also a case where a resource and another resource allocated to the former resource belong to different modules. The state of such data or resources described above is defined as "stored across (the modules)" when splitting the storage system. There is, for example, a case where a copy volume or a volume storing actual data of a virtual volume is assigned to an LDEV allocated to a LUN associated with a path belonging to a different module. FIG. 30 shows a specific example. The details will be explained later.

Next, the connection cable (splitting unit) 44 between the modules 20A and 20B is separated (step 8003). If the storage system 100 is not configured by coupling a plurality of modules, the processing proceeds to the next step.

The management server 50 is split into the management servers 50A and 50B for the sub-storage systems 20A and 20B respectively (step 8004). Separate system administrators may be provided for the sub-storage systems 20A and 20B by using the management server 50. At this point in time, the storage system 100 is split into the sub-storage systems 20A and 20B.

After the storage system 100 is split, the sub-storage systems 20A and 20B are accessed by the hosts 51A, 51B respectively. The host 51A (51B) cannot use resources in the sub-storage system 20B (20A). As a result, the CPUs 21 for the modules 20A, 20B and the CPUs for the management servers 50A, 50B serve as split processing management units that manage the split modules 20A and 20B as independent access targets as well as independent operation targets for the hosts 51A and 51B respectively.

This embodiment describes the case where one storage system is split into two storage systems; however, the same processing will be performed when splitting one storage system into a plurality of (more than two) storage systems.

Determination of Split Units; Details of Step 8001

When the storage system 100 is to be split and if there are modules 20A and 20B in the storage system 100 as shown in FIG. 1, the storage system 100 is split for each module.

If the storage system 100 has no module, the range to which management resources for each system administrator will belong after splitting the storage system 100 is determined. The management resources include LDEVs which are logical resources, cache memory size, and logical ports. The types of LDEVs include actual LDEVs and virtual VOLs used for, for example, thin provisioning. The control information such as the volume management information is also split so that it will belong to the same module as the aforementioned resources.

The user designates, on the screen of the management server 50, the module number for each resource. If LDEV#100 is allocated to the sub-storage system 20A, but if the path to which LDEV#100 has been allocated is allocated to the sub-storage system 20B, the path is reallocated to the module to which LDEV#100 is allocated in order to maintain the relationship between the path and the LDEV#100. Another method for this case is to allocate the LDEV to the module 20B to which the path is allocated.

Moreover, the split units are determined so that they will not overlap mapping of logical volumes and physical blocks. Other than the method of the user designating the resources and the modules one by one, the management server 50 may have a user-assisting program (not shown in the drawing) to have the management server 50 determine the resources and the modules in advance and display them on the screen of the management server 50 so that the user can easily make a decision.

After the split units or modules of the storage system 100 are decided, if a module receives a command or request that requires processing across the split units, the module receiving that command or request returns an error message to the requester. If a module receives a request or command that requires processing across a plurality of units before the split units of the storage system are decided, that module accepts and processes the request or command. Subsequently, data and control information are migrated between the modules.

Data Migration; Details of Step 8002

When the storage system 100 is to be split into the modules 20A and 20B, whether any resource "extends (or is stored) across" the modules 20A and 20B or not is checked. If some recourse extends (or is stored) across the modules 20A and 20B, data migration between the modules is scheduled. Specifically speaking, a destination module to which data should be migrated, and the logical volumes to be migrated are determined, and then migration processing is executed. As a result of the data migration, the control information is updated.

Also, in the case where the configuration has no module 20A or 20B, the split units are determined in step 8001, and a resource "extends (or is stored) across" the split units, data will be migrated in the same manner as described above.

Figures 28A, 28B:
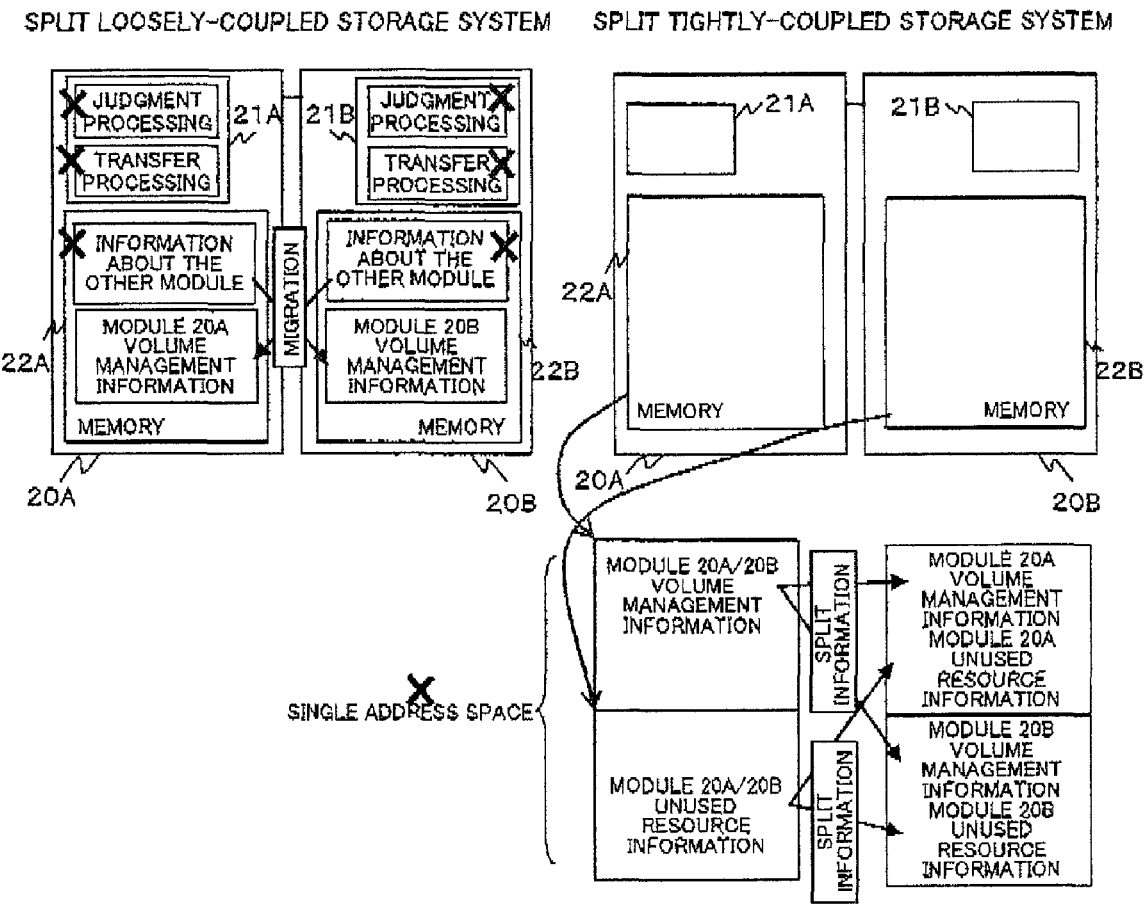
FIG. 28 is an internal configuration diagram showing the case where the loosely-coupled storage system or the tightly-coupled storage system is split.

FIG. 28(a) shows an example of memory information when splitting the storage system of the loosely-coupled configuration. Information of the other module is migrated to the module in control of that information and then deleted. The programs which are necessary for coupling the sub-storage systems and are used for processing for judging which module is in charge of other information and processing for transferring the relevant request to the module in charge are no longer necessary.

FIG. 28(b) shows an example of memory information when splitting the storage system of the tightly-coupled configuration. The volume management information and the unused resource management information are split to the modules controlling the relevant information, and the split pieces of information are stored in the corresponding addresses in the memory for the respective modules.

Operation Management Split; Details of Step 8004

The operation to split information about operation management is a reverse operation of coupling the management information. For this purpose, the management servers 50A, 50B should be installed for the modules 20A, 20B respectively. The general management server 50 may be treated as one management server for one module, and a management server 50 may be added to the network for the other module; or the system administrator accounts for the modules 20A and 20B may be set on the management server 50.

When splitting the operation management information, a split method can be selected depending on how the storage system is managed as outlined below.

(1) The entire storage system is managed by the general system administrator. Operation management originally conducted by one administrator is also possible even after splitting the storage system. The module 20A and the module 20B are made to recognize the system administrator account.

(2) The storage system is managed by the general system administrator on a module basis.

When a storage system managed solely by the general system administrator is to be split, the account needs to be split for each split module unit. The control information managed by the general system administrator is split into the modules controlling the relevant information (see FIG. 29), and each account is made to be recognized by the modules. The general system administrator account is eliminated. Similarly, the unused resource information is split into the modules controlling the relevant information. The split pieces of information are input to the unused resource information table in the relevant module controlling the relevant resources.

Thin Provisioning

"Thin Provisioning" is a technique using virtual volumes to dynamically allocate disk devices based on data writing. The capacity of a copy source volume (primary volume) is allocated from a pool area.

CoWS (CopyOnWrite Snapshot) is a technique of creating a copy volume (secondary volume). If pieces of access unit data, from among secondary volumes of plural generations, have the same content, only one piece of that data is stored in the pool and the plural generations refer to that data. The secondary volume will become a virtual volume. A full-copy replication function, which is copying of the entire logical volume, is not performed; and when performing processing for writing data to the primary volume or the secondary volume, the write target data (before data is written) is first saved in the pool and the write processing is then executed. If a plurality of generations have referred to the write target data (before data is written), mapping information showing the locations of all the data is changed.

A pool is used in the above-described techniques. Coupling or splitting of pool(s) will be explained below by mentioning "thin provisioning" as an example.

Thin Provisioning Pool Coupling

FIG. 30 shows a thin provisioning pool management method used when modules are coupled to each other. If "thin provisioning" is employed, after the modules are coupled to each other, pools in the storage system 100 can be used.

Figure 30A:
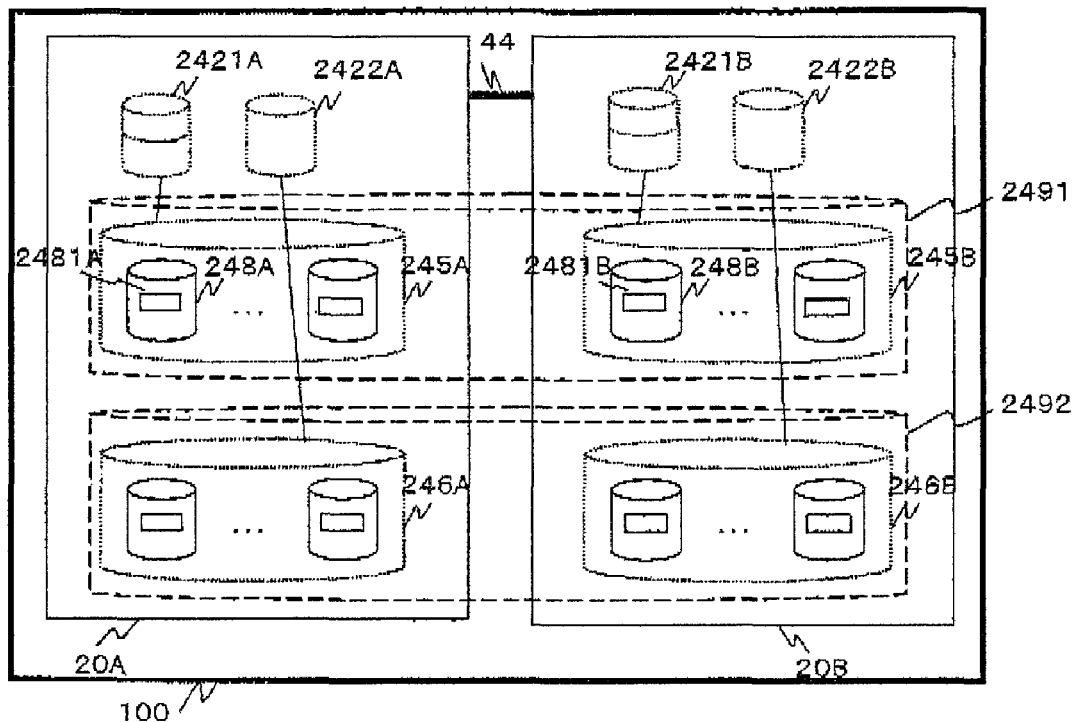
FIG. 30 is an internal configuration diagram for explaining pool coupling.

When the sub-storage systems 20A and 20B are coupled to each other to form the storage system 100, pools in the module 20A and 20B are coupled to each other. FIG. 30(a) shows an example of coupling pools where each module 20A, 20B has two pools. A pool 245A in the module 20A and a pool 245B in the module 20B are coupled together to create a new pool 2491.

Also, a pool 246A in the module 20A and a pool 246B in the module 20B are coupled together to create a new pool 2492. A virtual volume 2421A uses the pool 245A to store actual data before the pools are coupled together; however, after the pools are coupled to each other, the virtual volume 2421A then uses the pool 2491 and can store data also in the pool 245B. On the other hand, the virtual volume 2421B can use the pool 245A. Similarly, a logical volume 2422A uses the pool 246A before the pools are coupled together, but the logical volume 2422A can use the pool 2492 after the pools are coupled together.

Figure 30B:
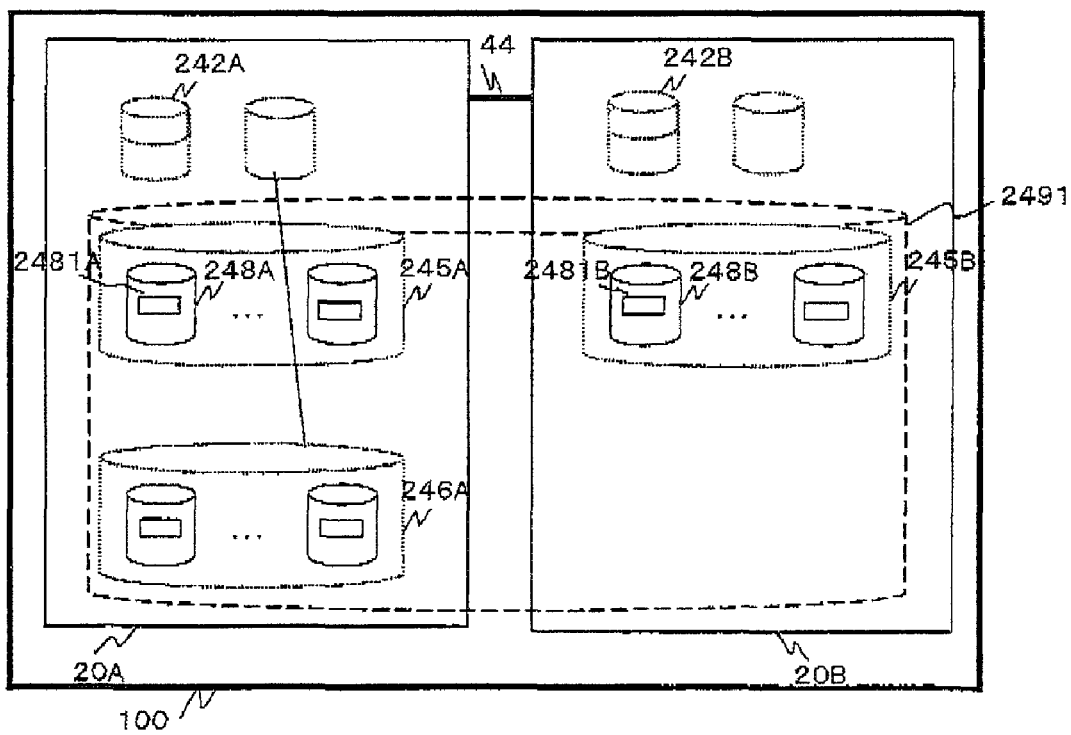

As shown in FIG. 30(b), a plurality of pools in the module 20A may be integrated with a pool in the module 20B.

FIG. 31 shows pool information. A pool control information table 101 stores the pool information in each module and includes, for each pool ID, a "pool capacity" indicating the total capacity available of the relevant pool, a "pool remaining capacity" obtained by subtracting the capacity being used from the pool capacity, a "pool remaining capacity threshold" used for judging whether the remaining capacity of the pool has become small or not, a "used virtual VOL number" that is the number of a virtual volume using the relevant pool, a "used pool VOL numbed" indicating the volume number of pool volume(s) forming the relevant pool, and "used pool VOL quantity" indicating the total quantity of the pool volume(s) forming the relevant pool.

Before the sub-storage systems 20A and 20B are coupled together, the pool control information table 101 is held by each the sub-storage system 20A, 206. FIG. 32 shows an integrated pool information table 102 that indicates integrated pool information for each pool ID after the pools are coupled together. For each integrated pool ID, the "pool ID" indicated in the pool control information table 101 and the "module number" indicating a module having that pool are registered with the integrated pool information table 102.

Figure 33:
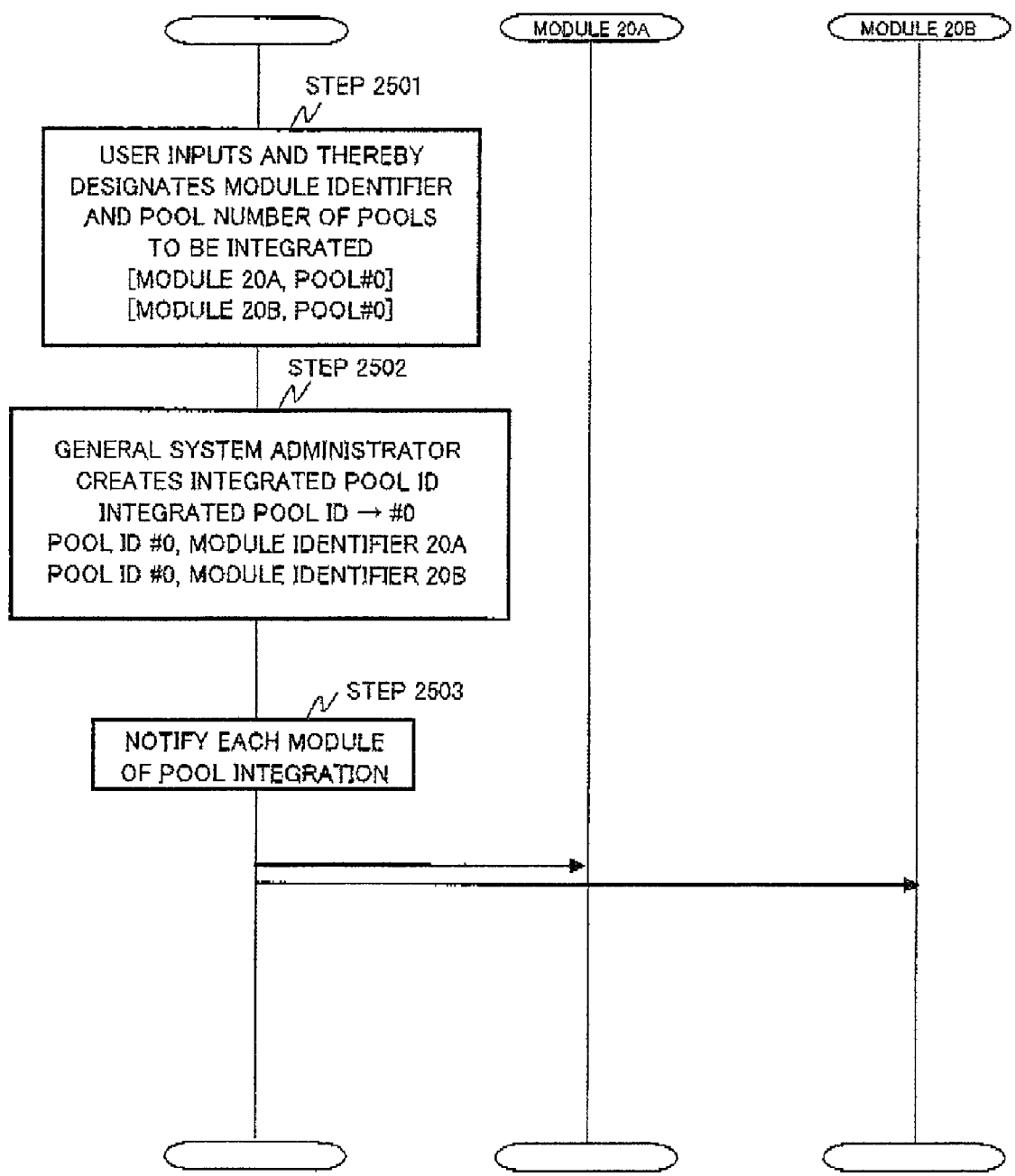
FIG. 33 is a flowchart illustrating pool integration processing.

Pool integration (coupling) processing will be explained below by following the flowchart in FIG. 33 and showing an example of coupling a pool #0 in the module 20A with a pool #0 in the module 20B to form an integrated pool #0.

First, the user designates pools to be coupled. In order to do so, the user designates the module numbers and the pool numbers in the relevant modules (step 2501). For example, the user designates the pool #0 in the module 20A and the pool #0 in the module 20B. Since the integrated pool information is managed by the general system administrator, the general system administrator creates the integrated pool ID (step 2502). After the pools are integrated with each other, the integration target modules, i.e., the modules 20A and 20B in this example, are notified that the pools have been integrated.

Pool Extending Across Modules

Figure 34:
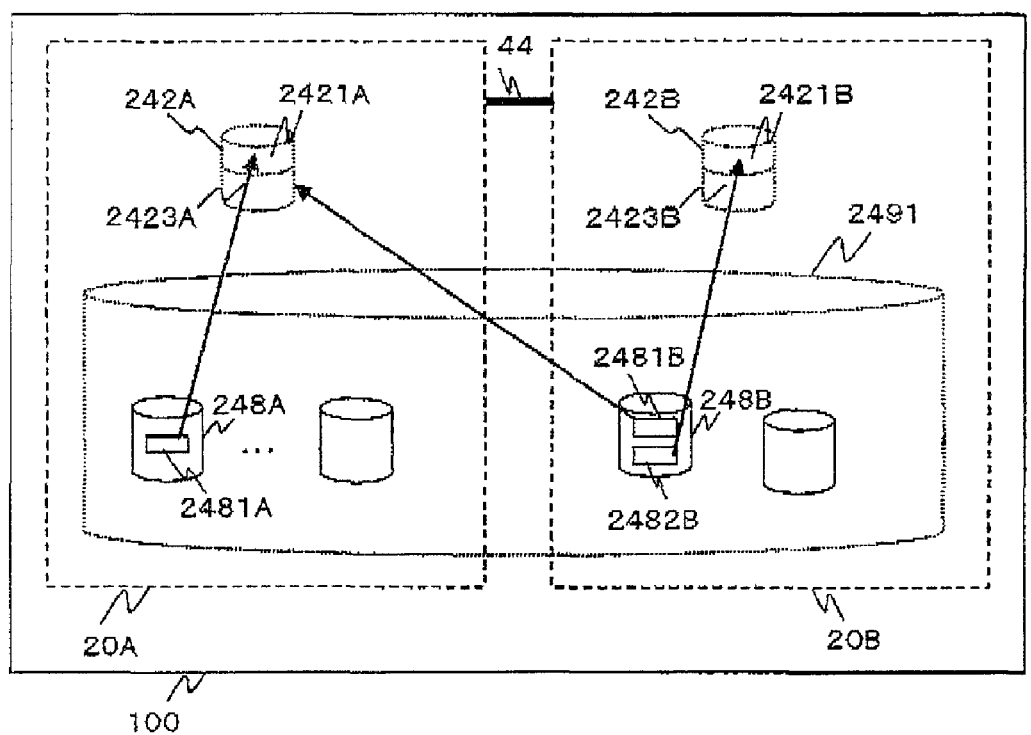
FIG. 34 is an internal configuration diagram illustrating the configuration of a pool extending across modules.

FIG. 34 shows an example in which a thin provisioning pool extends across modules.

An area 2421A for a virtual volume 242A in the module 20A is allocated to an area 2481A in a pool volume 248A. An area 2423A is allocated to an area 2481B for a pool volume 248B in the module 20B. The area 248B in the pool volume 248B is also allocated to an area 2421B for a virtual volume 242B in the module 20B.

FIG. 35 shows an example of control information for managing the above-described status. FIG. 35(a) shows the case where all the control information is managed generally by the storage system 100. A thin provisioning volume control information table 104 is used to indicate each of which area in a virtual volume is allocated to which pool. An area is determined specifically by designating its starting address and ending address. Alternatively, the relevant areas may be numbered and managed.

FIG. 35(b) shows an example of the case where control information is managed by dividing the control information into the modules 20A and 20B. A thin provisioning volume control information table 105A is stored in the module 20A. The same table is also stored in the module 20B. The thin provisioning volume control information table 105A shows each of which area in a thin provisioning volume in the module 20A is allocated to which pool volume.

The thin provisioning volume control information table 105A shows that the area 2421A is allocated to the area 2481A for the pool volume 248A in the module 20A to which the relevant virtual volume belongs. Since the area 2423A is allocated to the pool volume in the module 20B, which is a different module from that of the virtual volume, the module 20A does not have information about the pool volume or the area, so that the thin provisioning volume control information table 105A shows only the module number to which the pool volume having the allocated area belongs. On the other hand, a pool volume control information table 106B shows that the pool volume is used by the virtual volume 242A in the module 20A.

Figure 36:
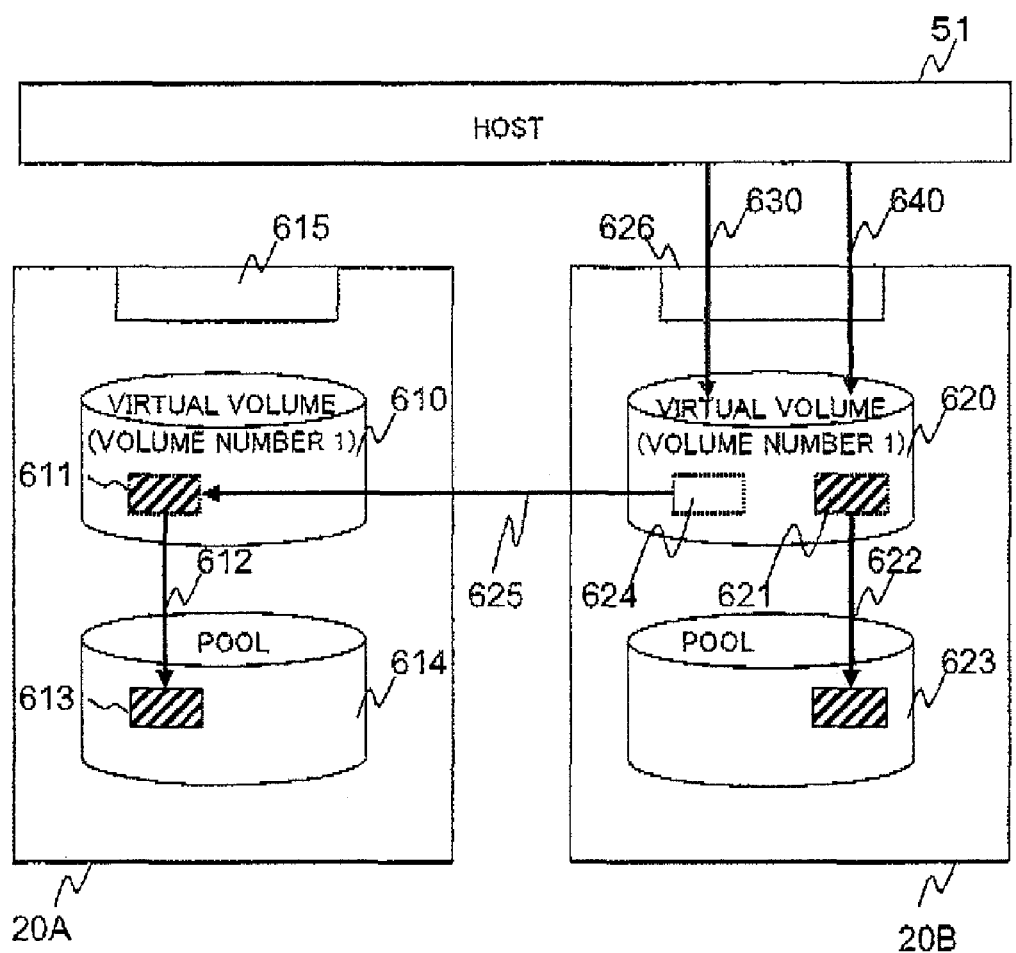
FIG. 36 is a configuration diagram for explaining how formation of modules from virtual volumes works.

FIG. 36 shows that the host 51 creates a virtual volume with a volume number "1" in the storage system and defines a path to that virtual volume via a port 615 in the module 20A and a port 626 in the module 20B. The module 20A has a pool 614, and the module 20B has another pool 623.

In order to create the virtual volume with the volume number "1" in both the module 20A and the module 20B, each module 20 should have the virtual volume table 105. An arrow 612 indicates that an area 611 for the virtual volume allocates a page to an area 613 in the pool, and an arrow 622 indicates that an area 621 allocates a page to a pool area 623.

An arrow 630 indicates a read command targeting the area 624, and an arrow 640 indicates a read command targeting the area 621. After receiving the read command indicated by the arrow 640, the module 20B refers to the virtual volume table 105B and checks the page allocation status of the area 821. As a result of the check, it is found that the area 621 uses a page in the pool 623 in the module 20B. Therefore, the module 20B transfers the data stored in the pool 623 to the host 51.

Meanwhile, after receiving the read command indicated by the arrow 630, the module 20B refers to the virtual volume table 105R and checks the page allocation status of the area 624. As a result of the check, it is found that the area 624 uses a page in the pool 613 in the module 20A. In this case, the module 20B issues a read processing request 625 to the module 20A. After receiving the read processing request, the module 20A executes the read command for the page in the module 20B. If a module receives an input/output (I/O) request from the host 51 and a page in another module 20 has been already allocated to the target area of the I/O request from the host 51 as described above, communication between the modules 20 is required.

Thin Provisioning Pool Splitting

Figures 37, 38:
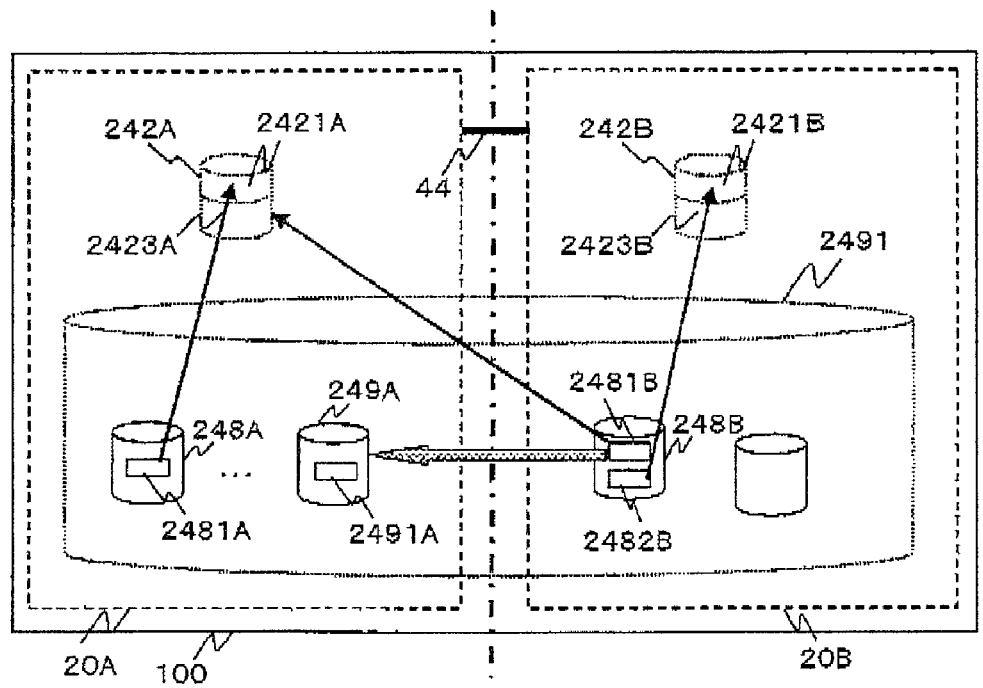
FIG. 37 is an internal configuration diagram for explaining the configuration in the case where the storage system having a pool extending modules is split into the modules.
FIG. 38 is a configuration diagram showing a thin provisioning volume control information table and a pool volume control information table.
Figure 39:
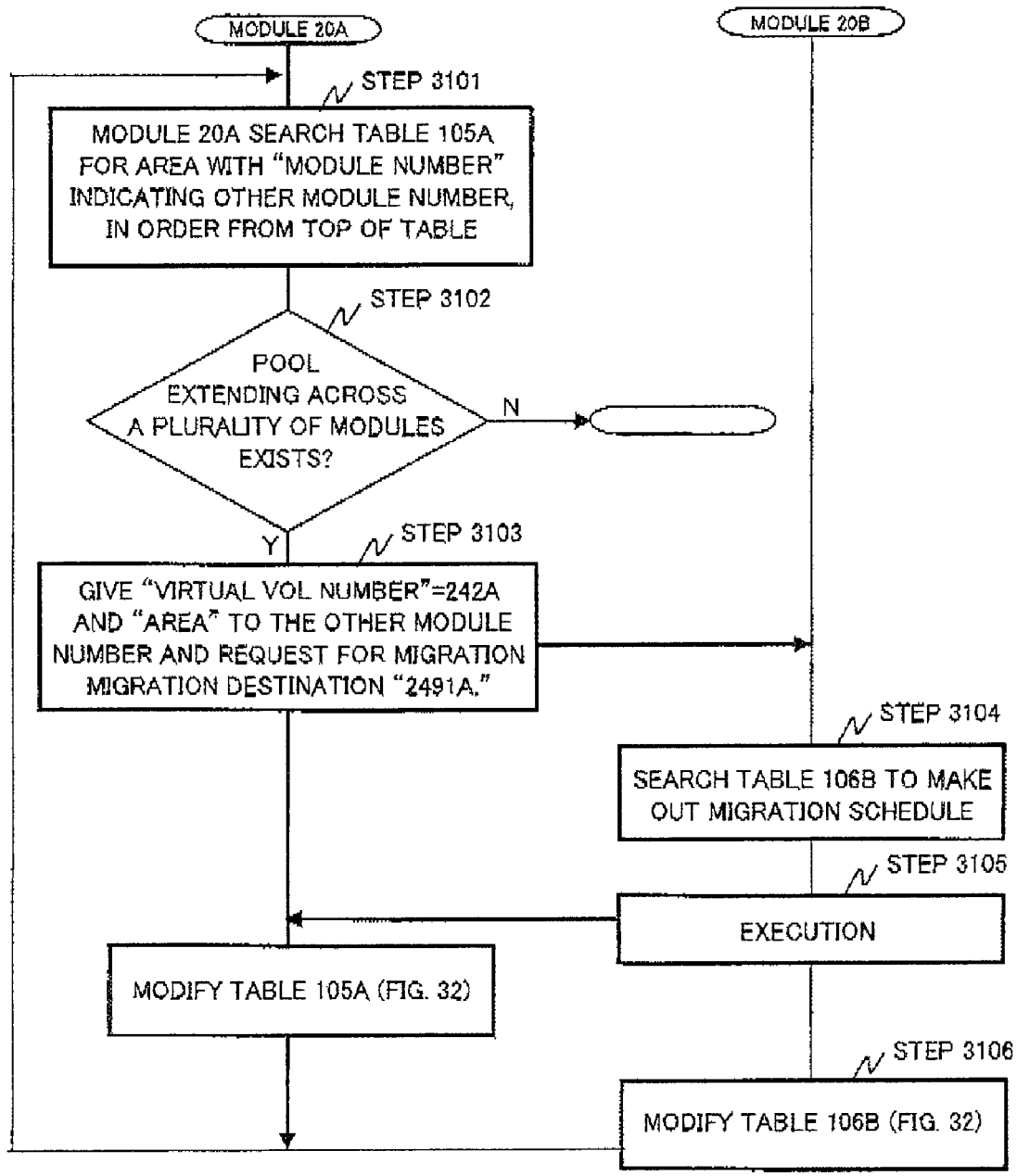
FIG. 39 is a flowchart illustrating pool split processing.

FIG. 37 shows an example in which the storage system 100 having the thin provisioning pool extending across the modules as shown in FIG. 34 is split into the modules 20A and 20B. The modules 20A and 20B have the thin provisioning volume control information tables 105A and 105B respectively (see FIG. 38). First, the module 20A searches these tables 105A and 105B for a pool extending across the modules as shown in FIG. 39 (step 3101).

This search is performed by searching table 105A for the module number of any module other than the module 20A in the "module number" field in order from the top of the table. If there is a pool extending across the modules, the module 20A proceeds to the next step; or if there is no pool extending across the modules, the module 20A terminates this processing (step 3102). In the next step, the module 20A sends a data migration request to the other module indicated in the "module number" in the table 105A (step 3103). In this example, the other module is the module 20B. The module 20A also gives the module 20B, together with the above request, the "virtual VOL number" and "area" information indicating the target to be migrated. The module 20A also gives the module 50B information about the destination area which is secured in the module 20A and to which data should be migrated.

The module 20B searches the table 106B for the area indicated by the migration destination module 20A, and makes out a schedule to execute migration processing (step 3104), and then executes the processing according to the schedule (step 3105). After the data migration is completed, the module 20B modifies the tables 106B and 105A (steps 3106 and 3107).

The above-described processing is for the case of the storage system 100 with the loosely-coupled configuration. In the tightly-coupled configuration, each module may send a request to the other module in the same manner as in the loosely-coupled configuration, or one module may execute processing for the other module.

The important point in this example is how to split the pool volume 248B in the module 20B, of which data is partly stored in the module 20A. Since the pool volume 248B is originally under the control of the module 20B, data in part of the pool volume 248B stored in the module other than the module 20B is migrated. In this example, an area 2491A in a pool volume 249A belonging to the pool in the module 20A used by the virtual volume 242A is secured, and data in the area 2481B is then copied to the area 2491A secured above.

When there is no more data stored across the modules, there will be no information in the "module number" in the thin provisioning volume control information table 105A and no volume number of the other module in the "allocated pool VOL number" in the pool volume control information table 106B.

Incidentally, processing to be executed in response to a request received while copying data is disclosed in, for example, U.S. Pat. No. 7,155,587.

Thin Provisioning Data Migration

Data is migrated between the modules in the same manner as the data migration described above, and each module is then configured so that virtual volumes and pools are closed in the module.

This embodiment has explained about "thin provisioning"; however, in the case of CoWS, a plurality of virtual volumes may be using the same data and, therefore, it is necessary to remember to copy that data as needed. Not only in the case of virtual volumes, but also in the case of replication, the storage system should be configured so that copy source volumes and copy destination volumes are in the same module by migrating data.

External Access

Figure 40:
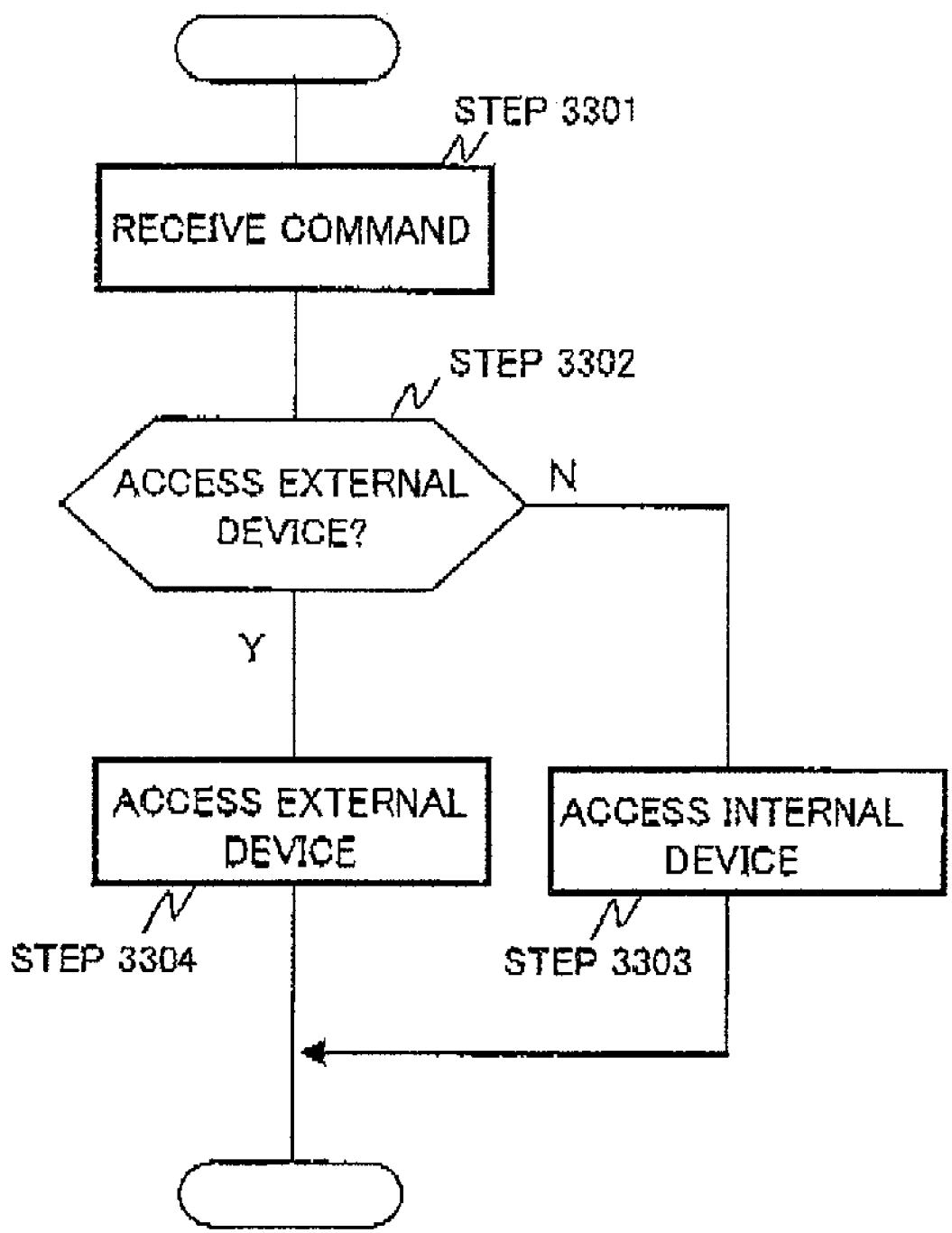
FIG. 40 is a flowchart illustrating external access.

Next, external access processing will be explained below by following the flowchart in FIG. 40. After the sub-storage system 20 receives an access request from the host (step 3301), an I/O program (not shown in the drawing) judges, based on device information (not shown in the drawing) stored in the sub-storage system 20, whether the designated local LDEV number corresponds to an internal LDEV or an external LDEV (step 3302). In other words, the program judges whether the access request is made to an external LDEV 701 or an internal LDEV 241.

If the access request is made to the external LDEV 701 (YES in step 3302), the sub-storage system 20 refers to a mapping table (not shown in the drawing) for the external LDEV 701, performs address conversion to the external LDEV 701, and sends the access request for the external LDEV 701 to the external storage system 70 (step 3304). On the other hand, if the access request is made to the internal LDEV 241 (NO in step 3302), the sub-storage system 20 accesses the internal LDEV 241 (step 3303).

Coupled LDEV Configuration

There is a coupled LDEV configuration obtained by coupling two or more logical volumes (LDEVs) together and defining them as one LDEV. Although the upper limit of a conventional LDEV size is previously set within the storage system, the coupled LDEV configuration is intended to provide the function providing a user with an area exceeding one LDEV size. The storage system is split so that LDEVs forming the coupled LDEV configuration will be in the same module.

Other System Configurations

Figure 4:
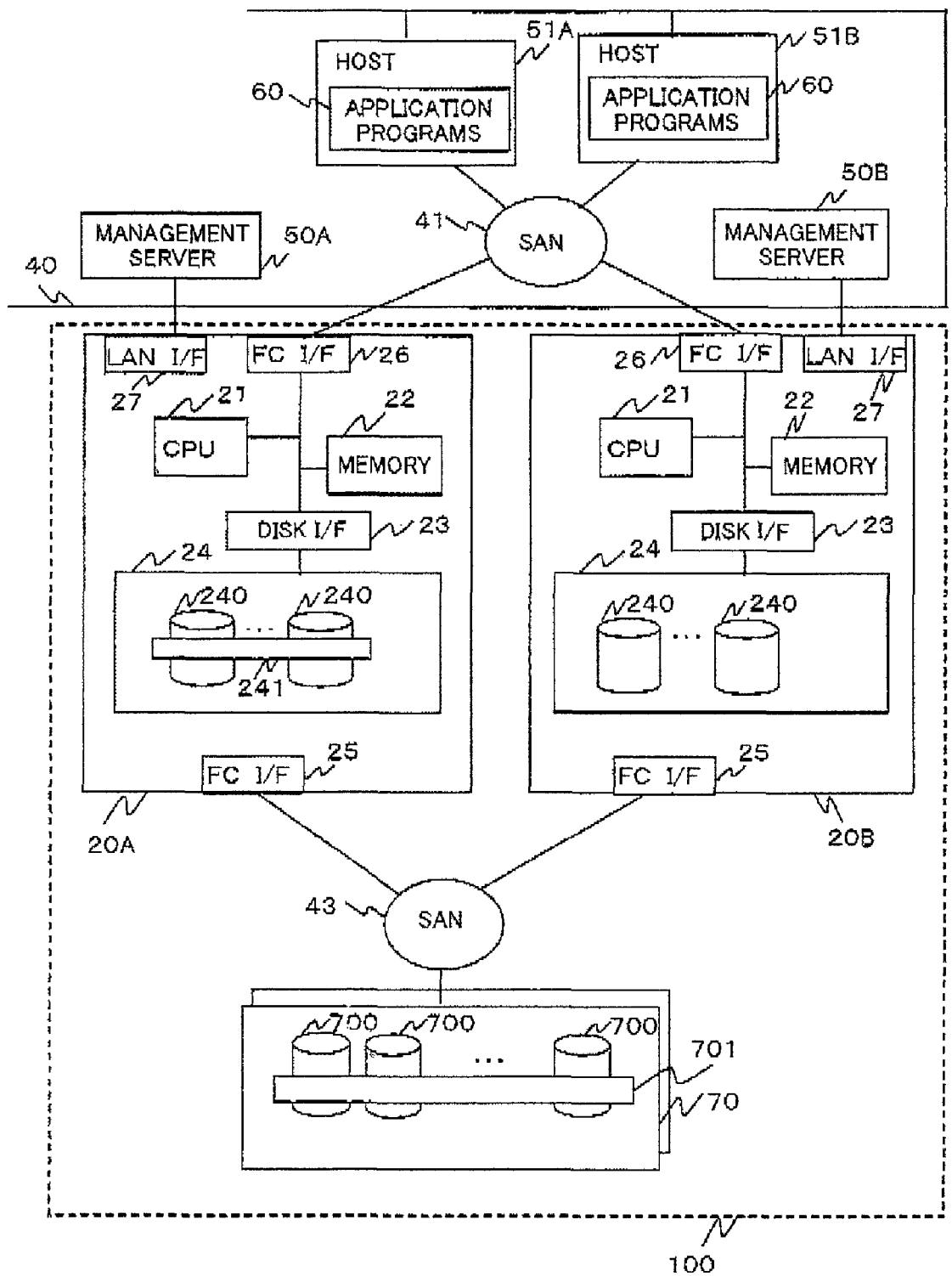
FIG. 4 is a block configuration diagram of a storage system according to the third embodiment of the invention.

As an example of other system configurations, an external storage unit may be connected to the sub-storage system 20 (see FIG. 4). The FC interface control unit 25 controls transferring commands and data between the sub-storage system 20 and the external storage system 70. Incidentally, a SAN 43 may mediate between the FC interface control unit 25 and the external storage system 70, or the FC interface control unit 25 and the external storage system 70 may be directly connected via, for example, optical fiber cables.

The external storage system 70 has one or more disk drives 700 having a RAID configuration. The disk drives 700 are storage devices such as FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SAS (Serial Attached SCSI) disk drives, or SCSI (Small Computer System Interface) disk drives. The external LDEV 701 is formed on the plurality of disk drives 700. Incidentally, other kinds of memory devices (such as flash memory) may also be used instead of or in addition to the disk drives 700.

An LDEV 243 is a virtual device having no actual storage area. A Substantial storage area for storing data exists in the logical device 701 in the external storage system 70 (described later in detail). Specifically speaking, the sub-storage system 20 incorporates the external LDEV 701 of the external storage system 70 as its own internal device and provides the host 51 with the internally incorporated device as a logical unit. If the host 51 is a UNIX (registered trademark) system, the logical unit will be associated with a Device File. If the host 51 is a Windows (registered trademark) system, the logical unit will be associated with a drive letter (drive name). The LUN (Logical Unit Number) is assigned to the logical unit, and a method for virtualizing and treating the external LDEV 701 as an internal device of the sub-storage system 20 can be utilized (see, for example, Japanese Patent Application Laid-open (Kokai) Publication No. 2005-107645 [U.S. application Ser. No. 10/769,805 and U.S. application Ser. No. 11/471,556]).

Figure 41:
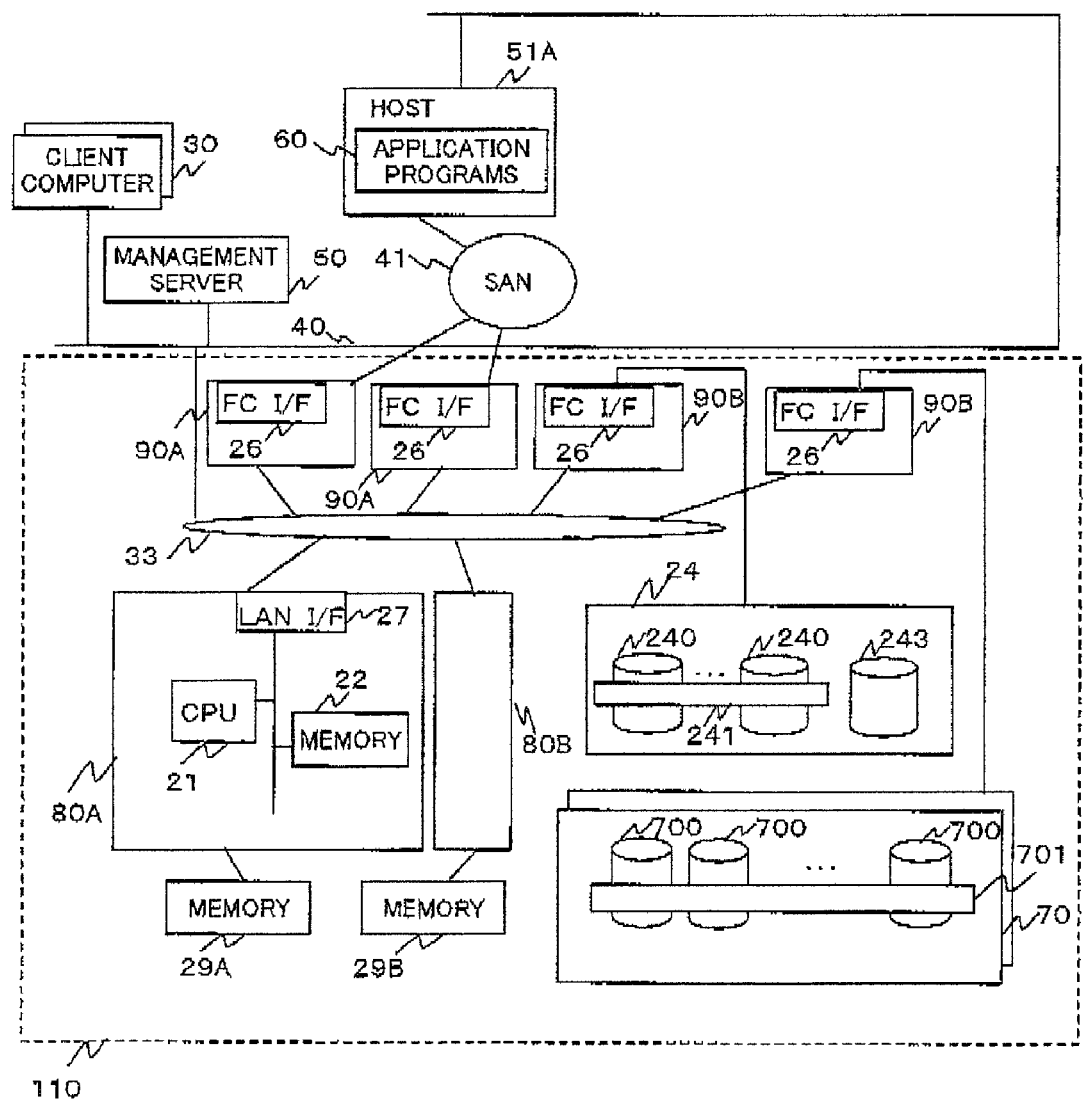
FIG. 41 is a block diagram of a storage system according to the fourth embodiment of the invention.

Next, FIG. 41 shows another system configuration. In this storage system, elements having the same device or the same function as those in FIG. 1 are given the same reference numerals as in FIG. 1, and any detailed description about these elements has been omitted.

A storage system 110 is composed of an I/F package unit 90, a control unit 80, nonvolatile memory 29, a network 33 connecting the I/F package unit 90 with the control unit 80, and disk device units 24 and 70. Each element is composed of at least one unit.

The storage system 110 is connected via a SAN 41 to the host 51. The I/F package unit 90A stores configuration information for recognizing which LDEV is stored in which control unit 80. The configuration information is also stored in a local memory 22 in the control unit 80 and in a memory 29. Alternatively, another processor (not shown in the drawing) may be provided on the network 33 and the processor may store the configuration information.

After receiving an input/output (I/O) command from the host, the I/F package unit 90A executes processing for analyzing the command, judging which control unit 80 manages the LDEV storing the requested data, and allocating the I/O command to the relevant control unit 80. Also, the I/F package unit 90A transfers data to the I/F package unit 90B and the disk devices 24 and 70. The control unit 80 transfers data to the memory 29.

Incidentally, the external storage system 70 may be of a different model type from that of the sub-storage system 20, or of the same model type as that of the sub-storage system 20. The sub-storage systems 20A and 20B may be connected respectively to the external storage systems 70A and 70B, which are housings different from those of the sub-storage systems 20A and 20B. The above-described configuration does not always require the existence of the external storage system 70.

In order to split the storage system 110 in the configuration shown in FIG. 41, the storage system 110 is split by control units 80, and the disk device 24 storing actual LDEV data controlled by a control unit 80 is made to belong to the same storage system to which the above-mentioned control unit 80 belongs. If the disk device 24 stores actual LDEV data controlled by the plurality of control units, actual LDEV data controlled by a control unit 80B different from a control unit 80A, to which the disk device 24A belongs, will be migrated.

If a disk device 2400A belonging to the control unit 80A stores actual LDEV data controlled by the control unit 80B the control unit 80 and the disk device can be physically split by migrating the actual data from the disk device 2400A to a disk device 2400B.

According to this embodiment, information can be managed dynamically (online) in accordance with any change (coupling or split) of the system configuration.

Also, according to this embodiment, storage systems can be coupled together dynamically; unified management can be realized when integrating a plurality of business enterprises or departments; management integration enables integration of service terminals as well as integration of system administrators; and as a result of coupling storage systems, unused resources in the respective storage systems can be mutually utilized.

Furthermore, according to this embodiment, a storage system can be split dynamically, and the performance of the storage system can be secured by managing information and utilizing resources on an enterprise basis, so that the enterprise using this storage system will not be deprived of their resources due to inputs/outputs by other enterprises.

Preferred embodiments of this invention have been described above. However, the embodiments described above are for the purpose of describing this invention, but the invention is not limited only to these embodiments. Accordingly, this invention can be utilized in other various ways.

What is claimed is:

1. A storage system comprising:
a plurality of sub-storage systems, each of the sub-storage systems being coupled to a host, a sub-storage system of the plurality of sub-storage systems comprising:
a first interface unit being coupled to the host via a first network, and for receiving a data input/output request from the host;
a storage apparatus including a plurality of storage devices;
a control unit that executes processing for inputting/outputting data to/from the storage apparatus in response to a data input/output request from a host that received the data by the first interface;
a transmission control device that controls data input/output by coupling the control unit with the storage apparatus; and
a second interface unit being coupled to a management apparatus via the second network,
wherein the storage system further comprises:
a coupling unit that couples at least two sub-storage systems of the plurality of sub-storage systems; and
an integrated management unit being configured with the management apparatus, or with a plurality of management apparatuses, coupled to each of the sub-storage systems,
wherein the integrated management unit manages by operating the plurality of sub-storage systems coupled to each other as a single access target for the host, manages by unifying a plurality of system administrator accounts and pieces of control information regarding the plurality of sub-storage systems, and manages, if there is a pool extending across both of storage areas provided by the storage apparatuses in the plurality of sub-storage systems, the pool in accordance with volume control information,
wherein when the plurality of sub-storage systems are coupled to each other to form a loosely-coupled configuration, each sub-storage system searches for an unused resource within itself, and when the unused resource within itself is not sufficient and cannot be allocated, another sub-storage system having a sufficient resource is selected and can be allocated, and
wherein when the plurality of sub-storage systems are coupled to each other to form a tightly-coupled configuration, any unused resource is allocated without regard to an identity of the sub-storage system.

2. The storage system according to claim 1,
wherein when managing the plurality of sub-storage systems as a loosely-coupled, single management target, the integrated management unit determines, in response to a data input/output request from the host and based on volume management information that is set for the sub-storage systems, which sub-storage system the data input/output request is made to, and
wherein according to the determination result, the integrated management unit transfers the data input/output request to the storage apparatus for the sub-storage system determined to be one that should receive the data input/output request.

3. The storage system according to claim 1, wherein when managing the plurality of sub-storage systems as a tightly-coupled, single management target, the integrated management unit executes, in response to a data input/output request from the host, processing for the data input/output request based on volume management information that is common to the plurality of sub-storage systems.

4. The storage system according to claim 1, wherein the integrated management unit manages a plurality of system administrator accounts for the plurality of sub-storage systems by making any one of the system administrator accounts active.

5. The storage system according to claim 1, wherein the integrated management unit couples system administrator accounts for the sub-storage systems together to form a single system administrator account for managing all the sub-storage systems.

6. The storage system according to claim 1, wherein the integrated management unit sets a system administrator account for each of the sub-storage systems to be unique to that sub-storage system, and also sets the system administrator account to manage all the sub-storage systems.

7. The storage system according to claim 1, wherein when the integrated management unit allocates the unused resource to a storage area in the storage apparatus for the sub-storage system, and if the unused resource is operated by a system administrator account different from a designated system administrator account, the integrated management unit prohibits processing by the different system administrator account.

8. A storage system having a plurality of sub-storage systems, each of the sub-storage systems including:
a first interface unit being coupled to a host via a first network, and for receiving a data input/output request from a host;
a storage apparatus including a plurality of storage devices,
a control unit for executing processing for inputting/outputting data to/from the storage apparatus in response to a data input/output request from a host that receives the data by the first interface unit;
a transmission control device for controlling data input/output by coupling the control unit with the storage apparatus; and
a second interface unit being coupled to a management unit via a second network,
wherein the storage system comprising:
a coupling unit that couples at least two sub-storage systems of the plurality of sub-storage systems;
an integrated management unit being configured with the management apparatus, or with a plurality of management apparatuses, coupled to each of the sub-storage systems; and
a splitting unit that splits the storage system into the plurality of sub-storage systems,
wherein the integrated management unit manages by operating the plurality of sub-storage systems coupled to each other as a single access target for the host, manages by unifying a plurality of system administrator accounts and pieces of control information regarding the plurality of sub-storage systems, and manages, if there is a pool extending across both of storage areas provided by the storage apparatuses in the plurality of sub-storage systems, the pool in accordance with volume control information, wherein the management apparatus, which is coupled to the second interface of the split sub-storage systems, manages the split sub-storage systems as individually independent access targets for the host, and also managing the split sub-storage systems as independent operation targets, wherein when the plurality of sub-storage systems are coupled to each other to form a loosely-coupled configuration, each sub-storage system searches for an unused resource within itself, and when the unused resource within itself is not sufficient and cannot be allocated, another sub-storage system having a sufficient resource is selected and can be allocated, and wherein when the plurality of sub-storage systems are coupled to each other to form a tightly-coupled configuration, any unused resource is allocated without regard to an identity of the sub-storage system.

9. The storage system according to claim 8, wherein each of the split processing management units selects information belonging to other sub-storage systems from among information belonging to itself and transfers the selected information to those other sub-storage systems.

10. The storage system according to claim 8, wherein each of the split processing management units transfers storage information and control information belonging to other sub-storage systems to those other sub-storage systems and relocates the storage information and control information at the transfer destinations.

11. The storage system according to claim 8, wherein if there is a pool extending across storage areas in the storage apparatuses for the plurality of existing sub-storage systems, each of the split processing management units splits the pool to be allocated to some of the sub-storage systems.

12. A storage system management method for managing a storage system, the storage system comprising a plurality of sub-storage systems, each of the sub-storage systems being coupled to a host and management apparatuses, the method comprising the steps of:

coupling the plurality of sub-storage systems to each other;

unifying a volume management information managed by each of the sub-storage systems;

managing the plurality of sub-storage systems coupled to each other as a single access target for a host, using the unified volume management information;

managing by integrating the plurality of sub-storage systems as a single operation target;

managing by respectively unifying a plurality of system administrator accounts and pieces of control information for managing regarding each of the sub-storage systems by each of the management apparatuses coupled to each of the sub-storage systems; and managing, if there is a pool extending across both of storage areas provided by the plurality of sub-storage systems, the pool in accordance with volume management information, wherein when the plurality of sub-storage systems are coupled to each other to form a loosely-coupled configuration, each sub-storage system searches for an unused resource within itself, and when the unused resource within itself is not sufficient and cannot be allocated, another sub-storage system having a sufficient resource is selected and can be allocated, and wherein when the plurality of sub-storage systems are coupled to each other to form a tightly-coupled configuration, any unused resource is allocated without regard to an identity of the sub-storage system.

13. The storage system management method according to claim 12, wherein the operation step is performed in such a manner that when managing the plurality of sub-storage systems as a loosely-coupled, single management target, which sub-storage system a data input/output request from the host is made to is determined in response to the data input/output request and based on volume management information that is set for the sub-storage systems, and wherein according to the determination result, the data input/output request is transferred to the storage apparatus for the sub-storage system determined to be one that should receive the data input/output request.

14. The storage system management method according to claim 12, further comprising:

when managing the plurality of sub-storage systems as a tightly-coupled, single management target, executing processing for a data input/output request from the host in response to the data input/output request and based on volume management information that is common to the plurality of sub-storage systems.

15. The storage system management method according to claim 12, further comprising:

managing a plurality of system administrator accounts for the plurality of sub-storage systems by making any one of the system administrator accounts active.

16. The storage system management method according to claim 12, further comprising:

coupling together system administrator accounts for the sub-storage systems to form a single system administrator account for managing all the sub-storage systems.

17. The storage system management method according to claim 12, further comprising:

setting a system administrator account for each of the sub-storage systems to be unique to that sub-storage system, and setting the system administrator account to manage all the sub-storage systems.

18. The storage system management method according to claim 12, further comprising:

when the unused resource is allocated to a storage area in the storage apparatus for the sub-storage system, and if the unused resource is operated by a system administrator account different from a designated system administrator account, prohibiting processing by the different system administrator account.

* * * * *